US010233361B2

(12) United States Patent
Kato et al.

(10) Patent No.: US 10,233,361 B2
(45) Date of Patent: *Mar. 19, 2019

(54) ADHESIVE SHEET

(71) Applicant: LINTEC CORPORATION, Itabashi-ku (JP)

(72) Inventors: Kiichiro Kato, Saitama (JP); Kazue Uemura, Tsukubamirai (JP); Yumiko Amino, Funabashi (JP); Shigeru Saito, Ina-machi (JP); Masaru Matsushima, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 50 days.

This patent is subject to a terminal disclaimer.

(21) Appl. No.: 15/300,152

(22) PCT Filed: Apr. 2, 2015

(86) PCT No.: PCT/JP2015/060418
§ 371 (c)(1),
(2) Date: Sep. 28, 2016

(87) PCT Pub. No.: WO2015/152352
PCT Pub. Date: Oct. 8, 2015

(65) Prior Publication Data
US 2017/0183544 A1 Jun. 29, 2017

(30) Foreign Application Priority Data

Apr. 2, 2014 (JP) .................................. 2014-076577
Apr. 2, 2014 (JP) .................................. 2014-076579
Apr. 2, 2014 (JP) .................................. 2014-076580

(51) Int. Cl.
*C09J 7/02* (2006.01)
*C09J 11/04* (2006.01)
(Continued)

(52) U.S. Cl.
CPC ................ *C09J 7/383* (2018.01); *B05D 1/36* (2013.01); *B05D 3/108* (2013.01); *B05D 5/00* (2013.01);
(Continued)

(58) Field of Classification Search
CPC ...... C09J 7/0217; C09J 11/04; C09J 2433/00; C09J 133/08; C09J 2201/606;
(Continued)

(56) References Cited

U.S. PATENT DOCUMENTS 6,294,250 B1 * 9/2001 Date ......................... C09J 7/50
428/353
9,240,131 B2 * 1/2016 Onderisin .............. B31D 1/027
(Continued)

FOREIGN PATENT DOCUMENTS

CN       1352674 A      6/2002
DE 10 2008 026 951 A1   12/2009
(Continued)

OTHER PUBLICATIONS

International Search Report dated Jun. 30, 2015 in PCT/JP2015/060418 Filed Apr. 2, 2015.

*Primary Examiner* — Patricia L. Nordmeyer
(74) *Attorney, Agent, or Firm* — Oblon, McClelland, Maier & Neustadt, L.L.P.

(57) ABSTRACT

A pressure sensitive adhesive sheet containing, on a substrate or a release material, a resin layer, at least a surface (α) of the resin layer being opposite to the side of the substrate or being opposite to the side which the release material is provided, having pressure sensitive adhesiveness, the surface (α) having one or more concave portions, the concave portions having irregular shapes. The pressure sensitive adhesive sheet has an excellent air escape property capable of easily removing air accumulation that may be formed on
(Continued)

attaching to an adherend, and is excellent in pressure sensitive adhesion characteristics.

14 Claims, 6 Drawing Sheets

(51) Int. Cl.
| | |
|---|---|
| B05D 5/00 | (2006.01) |
| C09J 7/38 | (2018.01) |
| C09J 201/00 | (2006.01) |
| C09J 133/08 | (2006.01) |
| B05D 1/36 | (2006.01) |
| B05D 3/10 | (2006.01) |
| C08K 3/34 | (2006.01) |
| C09J 5/00 | (2006.01) |
| C09J 7/22 | (2018.01) |
| C09J 7/20 | (2018.01) |
| C09J 7/25 | (2018.01) |
| C09J 7/10 | (2018.01) |
| C09J 121/00 | (2006.01) |
| C09J 167/00 | (2006.01) |
| C09J 175/04 | (2006.01) |
| C08K 3/013 | (2018.01) |
| C08K 3/36 | (2006.01) |
| C08K 7/00 | (2006.01) |

(52) U.S. Cl.
CPC .................... *C08K 3/34* (2013.01);
*C09J 5/00* (2013.01); *C09J 7/026* (2013.01);
*C09J 7/0207* (2013.01); *C09J 7/0217*
(2013.01); *C09J 7/0253* (2013.01); *C09J
7/0285* (2013.01); *C09J 7/10* (2018.01); *C09J
7/203* (2018.01); *C09J 7/22* (2018.01); *C09J
7/255* (2018.01); *C09J 7/38* (2018.01); *C09J
7/385* (2018.01); *C09J 11/04* (2013.01); *C09J
121/00* (2013.01); *C09J 133/08* (2013.01);
*C09J 167/00* (2013.01); *C09J 175/04*
(2013.01); *C09J 201/00* (2013.01); C08K
3/013 (2018.01); C08K 3/346 (2013.01); C08K
3/36 (2013.01); C08K 7/00 (2013.01); C08K
2201/003 (2013.01); *C09J 7/02* (2013.01);
*C09J 7/20* (2018.01); *C09J 2201/16* (2013.01);
*C09J 2201/28* (2013.01); *C09J 2201/36*
(2013.01); *C09J 2201/606* (2013.01); *C09J
2205/10* (2013.01); *C09J 2205/102* (2013.01);
*C09J 2205/114* (2013.01); *C09J 2400/163*
(2013.01); *C09J 2421/00* (2013.01); *C09J
2433/00* (2013.01); *C09J 2467/006* (2013.01);
*C09J 2475/00* (2013.01); *C09J 2483/005*
(2013.01)

(58) Field of Classification Search
CPC .... C09J 2201/28; C09J 2205/102; C09J 7/02;
C09J 7/385; C09J 7/255; C09J 7/203;
C09J 7/22; C09J 7/38; C09J 7/10; C09J
7/0207; C09J 7/0253; C09J 7/026; C09J
7/0285; C09J 7/20; C09J 5/00; C09J
201/00; C09J 2201/16; C09J 2201/36;
C09J 2205/10; C09J 2205/114; C09J
2400/163; C09J 2421/00; C09J 2467/006;
C09J 2475/00; C09J 2483/005; B05D
1/36; B05D 3/108; B05D 5/00; C08K
3/346; C08K 3/36; C08K 3/34; C08K
3/013; C08K 7/00; C08K 2201/003
See application file for complete search history.

(56) References Cited

U.S. PATENT DOCUMENTS

| | | |
|---|---|---|
| 2001/0051264 A1 | 12/2001 | Mazurek et al. |
| 2007/0004065 A1 | 1/2007 | Schardt et al. |
| 2007/0212964 A1* | 9/2007 | Massow ............... C08L 21/00 442/151 |
| 2007/0275203 A1 | 11/2007 | Ludwig |
| 2009/0047500 A1 | 2/2009 | Maeda |
| 2010/0092730 A1 | 4/2010 | Tomino et al. |
| 2010/0209671 A1 | 8/2010 | Kato |
| 2011/0014462 A1 | 1/2011 | Kanda |
| 2013/0011670 A1* | 1/2013 | Tsubaki ............... C08L 23/283 428/353 |
| 2015/0247064 A1 | 9/2015 | Kato et al. |

FOREIGN PATENT DOCUMENTS

| | | |
|---|---|---|
| EP | 0 279 579 A1 | 8/1988 |
| EP | 3 127 978 A1 | 2/2017 |
| EP | 3 127 982 A1 | 2/2017 |
| JP | 7-53930 A | 2/1995 |
| JP | 2001-507732 A | 6/2001 |
| JP | 2002-275433 A | 9/2002 |
| JP | 2004-115766 A | 4/2004 |
| JP | 2006-130672 A | 5/2006 |
| JP | 2008-150431 A | 7/2008 |
| JP | 2009-35609 A | 2/2009 |
| JP | 2009-231413 A | 10/2009 |
| JP | 2010-106239 A | 5/2010 |
| JP | 2011-12198 A | 1/2011 |
| JP | 2011-236370 A | 11/2011 |
| JP | 2012-136717 A | 7/2012 |
| JP | 2012-197332 A | 10/2012 |
| JP | 2012-201877 A | 10/2012 |
| WO | WO 98/08909 A1 | 3/1998 |
| WO | WO 2007/079919 A1 | 7/2007 |

* cited by examiner (a)

(b)

(a)

(b)

(a)

(b)

(a)

(b)

ADHESIVE SHEET

TECHNICAL FIELD

The present invention relates to a pressure sensitive adhesive sheet.

BACKGROUND ART

A general pressure sensitive adhesive sheet is constituted by a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by making the pressure sensitive adhesive layer into contact therewith.

A pressure sensitive adhesive sheet having a large attaching area, which may be used for identification or decoration, masking for painting, surface protection of a metal plate or the like, and the like, has a problem that on attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a particular shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a particular shape disposed in a prescribed pattern, as shown in PTL 1, has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the portion having the grooves disposed, and after attaching the pressure sensitive adhesive sheet to an adherend, there is a possibility that the sheet is detached therefrom in the portion.

In the case where the pressure sensitive adhesive sheet is attached to an adherend and then peeled again therefrom, there is a possibility of adhesive deposits remaining on the adherend depending on the peeling direction of the pressure sensitive adhesive sheet since the pressure sensitive adhesion characteristics of the pressure sensitive adhesive sheet varies locally. For example, in the case where the pressure sensitive adhesive sheet having a pressure sensitive adhesive layer wherein the grooves of a lattice pattern is disposed is peeled obliquely, there is a possibility of adhesive deposits remaining on the adherend.

Furthermore, in the case where the pressure sensitive adhesive sheet is punched out, there is a possibilty that the disposition pattern of the grooves overlaps the punching pattern. In this case, the cutting depth may fluctuate to provide a problem that a cut line cannot be suitably formed in the pressure sensitive adhesive sheet.

In general, such a process step of forming a trigger for peeling in order to facilitate the peeling of the release material (i.e., a so-called back slit) by only cutting a release material provided on the pressure sensitive adhesive sheet may be performed. In the case where the step is performed, it is the general procedure that the release material is once peeled off from the pressure sensitive adhesive sheet, and after putting notches in the release material, the release material and the pressure sensitive adhesive layer of the pressure sensitive adhesive sheet are again laminated with each other.

In the pressure sensitive adhesive sheet described in PTL 1, however, due to the use of an embossed liner as the release material, it is necessary to provide a separate release material that is not embossed. Because, it is difficult to follow to the emboss pattern of the release material, when laminating again the release material and the pressure sensitive adhesive layer.

In PTL 1, further, for forming a minute structure in the pressure sensitive adhesive layer, such a method is used that the pressure sensitive adhesive layer is once formed by coating a pressure sensitive adhesive on the embossed liner, and then the pressure sensitive adhesive layer and a substrate are laminated (i.e., a so-called transfer coating method). However, in the case where a substrate having a surface with low polarity, such as a polyolefin substrate, is used, sufficient adhesiveness cannot be obtained between the substrate and the pressure sensitive adhesive layer by the method.

Moreover, as different from a release material formed of paper, a release material formed of a resin film is difficult to form a fine emboss pattern to a pressure sensitive adhesive layer.

In addition, the pressure sensitive adhesive sheet described in PTL 1 is inferior in blister resistance, and thus has a problem that blister is liable to occur in the case where the sheet is used at a high temperature.

An object of the present invention is to provide a pressure sensitive adhesive sheet that has an excellent air escape property capable of removing air accumulation that may be formed on attaching to an adherend, and is excellent in pressure sensitive adhesion characteristics.

Solution to Problem

The present inventors have found that the problem can be solved by a pressure sensitive adhesive sheet containing a resin layer having on a surface thereof one or more concave portions, and the one or more concaves portion have an irregular shapes.

The present invention provides the following items [1] to [16].

[1] A pressure sensitive adhesive sheet containing, on a substrate or a release material, a resin layer, at least a surface (α) of the resin layer being opposite to the side of the substrate or being opposite to the side which the release material is provided, having pressure sensitive adhesiveness,
wherein the surface (α) has one or more concave portions, and
the one or more concave portions have irregular shapes.

[2] The pressure sensitive adhesive sheet according to the item [1], wherein the one or more concave portion are formed through self-formation of the resin layer.

[3] The pressure sensitive adhesive sheet according to the item [1] or [2], wherein the one or more concave portions do not have prescribed patterns.

[4] The pressure sensitive adhesive sheet according to any one of the items [1] to [3], wherein the one or more concave portions are not formed by transferring an emboss pattern.

[5] The pressure sensitive adhesive sheet according to any one of the items [1] to [4], wherein the surface (α) has thereon the plural concave portions.

[6] The pressure sensitive adhesive sheet according to the item [5], wherein the surface (α) of the resin layer has thereon the plural concave portions, and positions where the plural concave portions are present have no periodicity.

[7] The pressure sensitive adhesive sheet according to any one of the items [1] to [6], wherein an attached surface on the surface (α) of the resin layer has an irregular shape.

[8] The pressure sensitive adhesive sheet according to any one of the items [1] to [7], wherein the irregular shapes of the one or more concave portions present on the surface (α) are visible to the naked eyes from the side of the surface (α) exposed.

[9] The pressure sensitive adhesive sheet according to any one of the items [1] to [8], wherein the resin layer contains a resin part (X) containing a resin as a main component, and a particle part (Y) consisting of fine particles.

[10] The pressure sensitive adhesive sheet according to the item [9], wherein the resin part (X) contains one or more selected from a metal chelate crosslinking agent, an epoxy crosslinking agent, and an aziridine crosslinking agent.

[11] The pressure sensitive adhesive sheet according to the item [9] or [10], wherein the resin layer contains a multilayer structure having a layer (Xβ) mainly containing the resin part (X), a layer (Y1) containing 15% by mass or more of the particle part (Y), and a layer (Xα) mainly containing the resin part (X), laminated in this order from the side of the substrate or the release material provided.

[12] The pressure sensitive adhesive sheet according to the item [11], wherein the layer (Xβ) is a layer formed with a composition (xβ) containing a resin as a main component, the layer (Y1) is a layer formed with a composition (y) containing 15% by mass or more of fine particles, and the layer (Xα) is a layer formed with a composition (xα) containing a resin as a main component.

[13] A method for producing the pressure sensitive adhesive sheet according to any one of the items [1] to [10], containing at least the following steps (1) and (2):
step (1): a step of forming a coating film (x') formed by a composition (x) containing a resin as a main component, and a coating film (y') formed by a composition (y) containing 15% by mass or more of fine particles; and
step (2): a step of drying the coating film (x') and the coating film (y') formed in the step (1) simultaneously.

[14] A method for producing the pressure sensitive adhesive sheet according to the item [12], containing at least the following steps (1A) and (2A):
step (1A): a step of forming a coating film (xβ') formed by a composition (xβ) containing a resin as a main component, a coating film (y') formed by a composition (y) containing 15% by mass or more of the fine particles, and a coating film (xα') formed by a composition (xα) containing a resin as a main component, by laminating in this order on a substrate or a release material; and
step (2A): a step of drying the coating film (xβ'), the coating film (y') and the coating film (xα') formed in the step (1A) simultaneously.

[15] A method for producing the pressure sensitive adhesive sheet according to the item [12], containing at least the following steps (1B) and (2B):
step (1B): a step of forming a coating film (y') formed by a composition (y) containing 15% by mass or more of the fine particles and a coating film (xα') formed by a composition (xα) containing a resin as a main component, by laminating in this order on a layer (Xβ) containing mainly the resin part (X) provided a substrate or a release material; and
step (2B): a step of drying the coating film (y') and the coating film (xα') formed in the step (1B) simultaneously.

[16] A viscoelastic layer containing a resin, a least one surface thereof having one or more concave portions, the one or more concave portions having irregular shapes.

Advantageous Effects of Invention

The pressure sensitive adhesive sheet of the present invention has an excellent air escape property capable of easily removing air accumulation that may be formed on attaching to an adherend, and is excellent in pressure sensitive adhesion characteristics.

DESCRIPTION OF EMBODIMENTS

In the present invention, for example, the descriptions "the YY containing the XX component as a main component" and "the YY mainly containing the XX component" mean that "among the components contained in the YY, the component having the largest content is the XX component". In the descriptions, the specific content of the XX component is generally 50% by mass or more, preferably from 65 to 100% by mass, more preferably from 75 to 100% by mass, and further preferably from 85 to 100% by mass, based on the total amount (100% by mass) of the YY.

In the present invention, for example, "(meth)acrylic acid" means both "acrylic acid" and "methacrylic acid", which is also applied to the analogous terms.

The lower limit values and the upper limit values that are described in a stepwise manner for the preferred numeral ranges (for example, the ranges of the contents) may be individually combined. For example, from the description "preferably from 10 to 90, and more preferably from 30 to 60", the "preferred lower limit value (10)" and the "more preferred upper limit value (60)" may be combined to make a range of "from 10 to 60".

Structure of Pressure Sensitive Adhesive Sheet

The structure of the pressure sensitive adhesive sheet of the present invention will be described.

The pressure sensitive adhesive sheet of the present invention contains a substrate or a release material having thereon a resin layer, at least a surface (α) of the resin layer opposite to the side with the substrate or the release material provided has pressure sensitive adhesiveness, the surface (α) has a concave portion, and the concave portion has an irregular shape.

Figure 1:
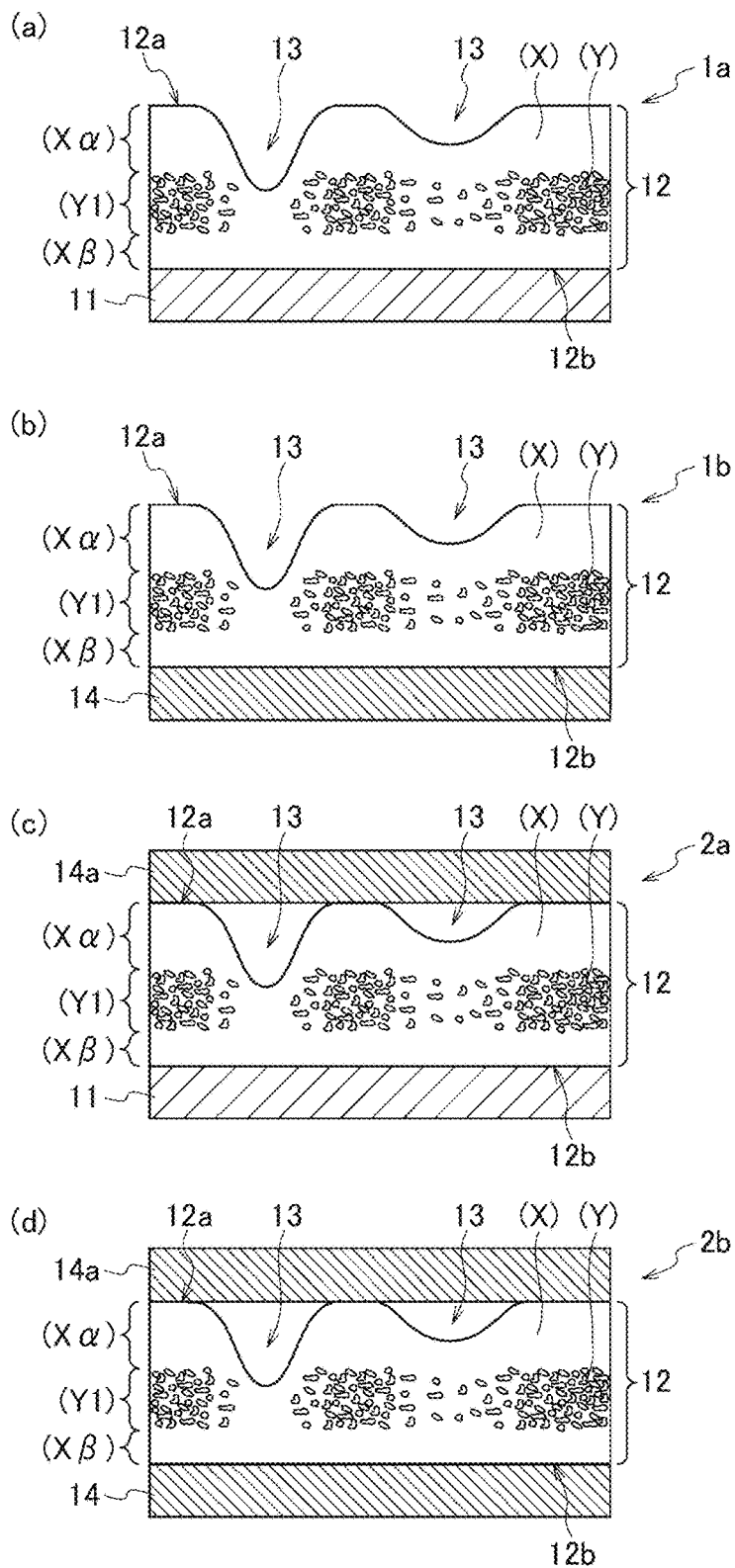
FIG. 1 is a schematic cross sectional view showing an example of the structure of the pressure sensitive adhesive sheet of the present invention.

FIG. 1 is a schematic cross sectional view showing an example of the structure of the pressure sensitive adhesive sheet of the present invention.

Examples of the specific structure of the pressure sensitive adhesive sheet according to one embodiment of the present invention include a pressure sensitive adhesive sheet 1a shown in FIG. 1(a) containing a substrate 11 having thereon a resin layer 12, and a pressure sensitive adhesive sheet 1b shown in FIG. 1(b) containing a release material 14 having thereon a resin layer 12.

In the pressure sensitive adhesive sheet of the present invention, at least a surface (α) 12a of the resin layer 12 opposite to the side with the substrate 11 or the release material 14 provided (which may be hereinafter referred simply to as a "surface (α)") has pressure sensitive adhesiveness.

Accordingly, the pressure sensitive adhesive sheet according to one embodiment of the present invention preferably has structures of pressure sensitive adhesive sheets 2a and 2b shown in FIGS. 1(c) and 1(d) further containing a release material 14a provided on the surface (α) 12a of the resin layer 12 of the pressure sensitive adhesive sheet 1a or 1b shown in FIG. 1, from the standpoint of the handleability.

In the pressure sensitive adhesive sheet according to one embodiment of the present invention, furthermore, a surface (β) 12b of the resin layer 12 on the side with the substrate 11 or the release material 14 provided (which may be hereinafter referred simply to as a "surface (β)") may have pressure sensitive adhesiveness. When the surface (β) also has pressure sensitive adhesiveness, the adhesiveness between the resin layer 12 and the substrate 11 is enhanced in the pressure sensitive adhesive sheets 1a and 2a shown in FIGS. 1(a) and 1(c), and a double-faced pressure sensitive adhesive tape is obtained in the pressure sensitive adhesive sheets 1b and 2b shown in FIGS. 1(b) and 1(d).

The resin layer 12 of the pressure sensitive adhesive sheet of the present invention preferably contains a resin part (X) containing a resin as a main component, and a particle part (Y) consisting of fine particles. By the particle part (Y) contained in the resin layer, the resulting pressure sensitive adhesive sheet can be effectively suppressed in occurrence of blister used under a high temperature.

The structure of the distribution of the resin part (X) and the particle part (Y) in the resin layer 12 may be such a structure that the resin part (X) and the particle part (Y) are distributed substantially homogeneously, or such a structure that can be divided locally into a region formed mainly of the resin part (X) and a region formed mainly of the particle part (Y).

Furthermore, as shown in FIGS. 1(a) to 1(d), at the position having a concave portion 13 on the surface (α) in the resin layer 12, the proportion occupied by the particle part (Y) may be smaller than the other parts, and the particle part (Y) may not be present partially.

The resin layer of the pressure sensitive adhesive sheet of the present invention has one or more concave portions on the surface (α), and the one or more concave portions have irregular shapes.

The length of the concave portion 13 present on the surface (α) on a plan view of the concave portion 13 is not particularly limited. Specifically, the concave portion 13 includes one having a relatively long groove shape and one having a relatively short dimple shape.

The concave portion 13 present on the surface (α) has a function as an air discharging path for escaping the "air accumulation" formed on attaching the pressure sensitive adhesive sheet of the present invention to an adherend to the exterior.

In the present invention, the state where "the one or more concave portions have irregular shapes" means that the shapes thereof in the plan view or the perspective view do not have specific shapes, such as shapes surrounded only by a circle or a straight line (e.g., a triangular shape and a rectangular shape), and do not have regularity, and there is no similarity found among the shapes of the respective concave portions.

The determination as to whether or not the one or more concave portions on the surface (α) have irregular shapes is made in principle by observing the shapes of the one or more concave portion three-dimensionally visually or with a digital microscope (magnification: 30 to 100). In the case where the planar shapes of the one or more concave portions in the plan view from the side of the surface (α) are determined to be irregular shapes, it may be assumed that "the one or more concave portions have irregular shapes".

However, in the case where 10 regions (R) each surrounded by a square having an edge length of 4 mm that are arbitrarily selected on the surface (α) are selected, and in the observation of the shapes of the one or more concave portions present in the respective regions (R) visually or with a digital microscope (magnification: 30 to 100) from the side of the surface (α) in the plan view (in the perspective view depending on necessity), in the case where in all the 10 selected regions, the shapes of the one or more concave portions present in the regions each are determined to be an irregular shape, it may be assumed that "the shapes of the concave one or more portions on the surface (α) of the resin layer are irregular shapes".

In the case where the region (R) is larger than the photographable region of the digital microscope, an image obtained by stitching plural images which are obtained by photographing the photographable regions adjacent to each other may be used as the image obtained by observing the region (R) and may be used for the aforementioned determination.

In the description herein, examples of the digital microscope used for observing the various shapes include "Digital Microscope VHX-1000" and "Digital Microscope VHX-5000", product names, produced by Keyence Corporation.

There has been known a pressure sensitive adhesive sheet having a pressure sensitive adhesive layer having definite grooves having been designed in advance, which are formed on the surface thereof, for example, by transferring an emboss pattern, such as the pressure sensitive adhesive sheet described in PTL 1. In the pressure sensitive adhesive sheet of this type, the grooves have a definite shape, and even though the shape of the grooves is designed to improve one feature selected from the air escape property, the appearance, the pressure sensitive adhesion characteristics, the punching property, and the like, the other features are often deteriorated.

The present inventors have focused attention to the point that the shape of the grooves that contributes to the enhancement of the air escape property and the shape of the grooves that contributes to the enhancement to the pressure sensitive adhesion characteristics are different from each other in the shape of the grooves demanded for the enhancement of the features, and the present inventors have found the technical significance of the presence of one or more concave portions of irregular shapes on the surface ($\alpha$) of the resin layer having pressure sensitive adhesiveness.

Specifically, in the pressure sensitive adhesive sheet of the present invention having the one or more concave portions having irregular shapes present on the surface ($\alpha$) of the resin layer, the one or more concave portions formed are different in contribution to the enhancement of the various features including the air escape property, the appearance, the pressure sensitive adhesion characteristics, the punching property, and the like, and thereby a pressure sensitive adhesive sheet enhanced in these features in a well-balanced manner can be obtained.

The irregular shapes of the one or more concave portions are preferably confirmed visually from the side of the surface ($\alpha$) of the resin layer exposed outside, from the standpoint of providing the pressure sensitive adhesive sheet having enhanced air escape property. For the pressure sensitive adhesive sheet 2a or 2b having a release material 14a further provided on the surface ($\alpha$) 12a of the resin layer 12, as shown in FIG. 1(c) or 1(d), the irregular shapes are preferably confirmed visually from the side of the surface ($\alpha$) exposed outside after peeling off the release material 14a.

The one or more concave portions are preferably formed through self-formation of the resin layer.

The "self-formation" in the present invention means such a phenomenon that a disorganized state is spontaneously formed through the autonomous formation process of the resin layer, and more specifically, a disorganized state is spontaneously formed through the autonomous formation process of the resin layer by drying a coating film formed with a composition as a formation material of the resin layer.

The shapes of the one or more concave portions formed by self-formation of the resin layer can be controlled to a certain extent by adjusting the drying condition and the kinds and the contents of the components of the composition as the formation material of the resin layer, but as being different from grooves formed by transferring an emboss pattern, it can be said that "it is substantially impossible to reproduce the completely same shape". Accordingly, it can be said that the one or more concave portion formed by self-formation of the resin layer have irregular shapes.

It is considered that the formation process of the one or more concave portions on the surface ($\alpha$) of the resin layer of the pressure sensitive adhesive sheet of the present invention is as follows.

In the formation of the coating film formed of the composition as a forming material of the resin layer, in the process step of drying the coating film, a contraction stress occurs inside the coating film, by which cracks are formed in the coating film at positions where the bounding strength of the resin is weakened. Subsequently, it is considered that the resin surrounding the cracked portions flow into the spaces that is temporarily formed by the cracks, and thereby the one or more concave portions are formed on the surface ($\alpha$) of the resin layer.

It is considered that after forming the two layers of the coating film that are different in the content of the resin, the two layers of the coating films are simultaneously dried, and thereby a difference in contraction stress occurs inside the coating films on drying, so as to facilitate the formation of cracks in the coating film.

The conditions are preferably controlled in consideration of the factors described below, from the standpoint of facilitating the formation of the one or more concave portions. It is considered that the formation of the one or more concave portions are facilitated due to the combined action of these factors. Preferred embodiments of the factors that facilitate the formation of the one or more concave portions will be described in the descriptions for the respective factors later.

The kind, the constituent monomer, the molecular weight, and the content of the resin contained in the composition as a formation material of the coating film The kind of the crosslinking agent and the kind of the solvent contained in the composition as a formation material of the coating film The viscosity and the solid concentration of the composition as a formation material of the coating film The thickness of the coating film formed (the thicknesses of the coating films in the case of plural layers formed)

The drying temperature and the drying time of the coating film formed

In the formation of a pressure sensitive adhesive layer of an ordinary pressure sensitive adhesive sheet, the aforementioned factors are often determined appropriately for forming a pressure sensitive adhesive layer having a flat surface.

In the present invention, on the other hand, the aforementioned factors are determined in a manner that intentionally forms the one or more concave portions capable of contributing to the enhancement of the air escape property of the pressure sensitive adhesive sheet, which is completely different from the design concept of the pressure sensitive adhesive layer of the ordinary pressure sensitive adhesive sheet.

The aforementioned factors are preferably determined appropriately in consideration of the flowability of the resin contained in the coating film formed.

For example, in the case where the composition contains fine particles, by controlling the viscosity of the coating film formed of a composition containing a large amount of the fine particles to a suitable range, the mixing with the other coating film (e.g., the coating film containing a large amount of the resin) can be appropriately suppressed while retaining the prescribed flowability of the fine particles in the coating film. By controlling in this manner, there is a tendency that cracks are formed in the horizontal direction in the coating film containing a large amount of the resin, thereby facilitating the formation of the one or more concave portions.

As a result, the proportion of the one or more concave portions occupied on the surface (α) can be increased, and simultaneously the proportion of the one or more concave portions that are connected to each other can also be increased, thereby providing the pressure sensitive adhesive sheet that is further excellent in air escape property.

Among the aforementioned factors, the kind, the constitutional monomer, and the molecular weight of the resin, and the content of the resin are preferably controlled in such a manner that the resin that is contained in the coating film containing a large amount of the resin has appropriate viscoelasticity.

Specifically, the hardness of the coating film (i.e., the hardness that is determined by such factors as the viscoelasticity of the resin, the viscosity of the coating liquid, and the like) is appropriately increased, and thereby the contraction stress of the resin part (X) is increased to facilitate the formation of the one or more concave portions. When the hardness of the coating film is larger, the contraction stress becomes larger to facilitate the formation of the one or more concave portions, but when the hardness is too large, the coating suitability may be deteriorated. When the elasticity of the resin is excessively increased, there is a tendency that the pressure sensitive adhesive strength of the resin layer formed with the coated layer is lowered. In consideration of these points, it is preferred that the viscoelasticity of the resin is appropriately determined.

It is considered that in the case where fine particles are contained in the composition and the coating film, by optimizing the dispersion state of the fine particles, the extent of the increase of the thickness of the resin layer by the fine particles, and the self-formation power of the one or more concave portions are controlled, and thereby the conditions can be controlled to facilitate the formation of the one or more concave portions on the surface (α) consequently.

Further, the aforementioned factors are preferably determined in consideration of the crosslinking rate of the coating film formed (or the composition as a formation material).

Specifically, when the crosslinking rate of the coating film is too large, there is a possibility that the coated layer is cured before the formation of the one or more concave portions. It may also influence the size of the cracks of the coating film.

The crosslinking rate of the coating film can be controlled by appropriately determining the kind of the crosslinking agent and the kind of the solvent in the composition as a formation material, and the drying time and the drying temperature of the coating film.

The one or more concave portions of irregular shapes on the surface (α) of the resin layer of the pressure sensitive adhesive sheet of the present invention preferably do not have a prescribed pattern. The "prescribed pattern" herein means such a shape that on focusing on the shape of one of the one or more concave portions, one of the one or more concave portions becomes a prescribed repeating unit thereof.

The one or more concave portions on the surface (α) of the resin layer are preferably not formed by transferring an emboss pattern, for example, transferring an emboss pattern by pressing a release material having an emboss pattern formed on the surface thereof onto the surface of the resin layer, from the standpoint of providing the pressure sensitive adhesive sheet that is enhanced in the features including the air escape property, the appearance, the pressure sensitive adhesion characteristics, the punching property, and the like in a well-balanced manner.

In the pressure sensitive adhesive sheet of the present invention, as shown in FIGS. 1(a) to (d), the surface (α) of the resin layer 12 being opposite to the side of the substrate 11 or the release material 14 provided preferably has thereon the plural concave portions 13.

It is preferred that the concave portions 13 on the surface (α) satisfy one or more of the following requirements (I) to (IV), it is more preferred that the one or more concave portions that satisfy the requirement (I) satisfy one or more of the following requirements (II) to (IV), and it is further preferred that the one or more concave portions that satisfy the requirement (I) satisfy all the requirements (II), (III), and (IV) in the pressure sensitive adhesive sheet of the present invention.

Requirement (I): The one or more concave portions have a maximum height difference of 0.5 μm or more.

Requirement (II): The surface (α) of the resin layer has thereon the plural concave portions, and 95% or more of the one or more concave portions have shapes that are different from each other.

Requirement (III): One or more of the concave portions are present in a region (Q) surrounded by a square having an edge length of 1 mm that is arbitrarily selected on the surface (α) of the resin layer.

Requirement (IV): The surface (α) of the resin layer has thereon the plural concave portions, and positions where the plural concave portions are present have no periodicity.

The requirements (I) to (IV) will be described in detail below.

Requirement (I)

Figure 2:
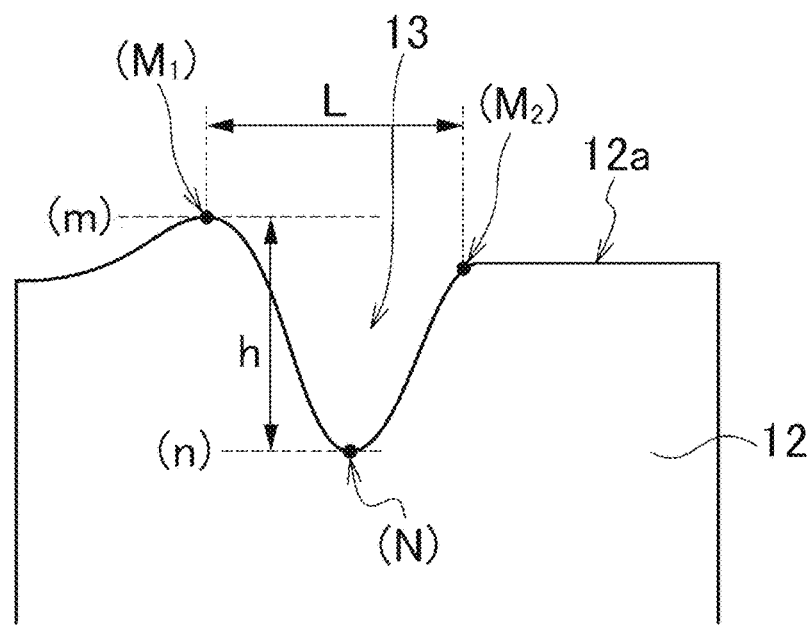
FIG. 2 is a schematic cross sectional view of a resin layer showing an example of the shape of the resin layer on the side of the surface (α) of the pressure sensitive adhesive sheet of the present invention.
Figure 2:
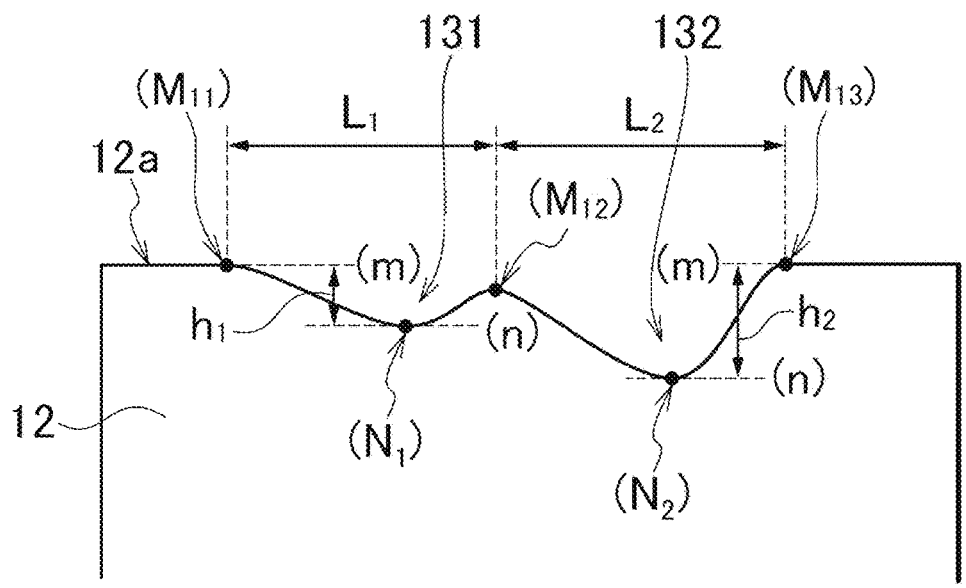

FIG. 2 is a schematic cross sectional view showing an example of the shape of the resin layer on the side of the surface (α) of the pressure sensitive adhesive sheet of the present invention.

As a concave portion 13 shown in FIG. 2(a), the shape of the normal concave portion has two peaks ($M_1$) and ($M_2$) and a valley (N). In the present invention, the "height difference" of the concave portion means the difference (h) in the thickness direction of the resin layer 12 between the highest position (m) among the two peaks ($M_1$) and ($M_2$) (i.e., the maximum point of the peak ($M_1$) in FIG. 2(a)) and the lowest position (n) among them (i.e., the minimum point of the valley (N) in FIG. 2(a)).

In the case shown in FIG. 2(b), it is considered that two concave portion are present, i.e., a concave portion 131 having two peaks ($M_{11}$) and ($M_{12}$) and a valley ($N_1$), and a concave portion 132 having two peaks ($M_{12}$) and ($M_{13}$) and a valley ($N_2$). In this case, the length of the difference ($h_1$) between the maximum point of the peak ($M_{11}$) and the minimum point of the valley ($N_1$) shows the height difference of the concave portion 131, and the length of the difference ($h_2$) between the maximum point of the peak ($M_{13}$) and the minimum point of the valley ($N_2$) shows the height difference of the concave portion 132.

The "one or more concave portions" defined in the requirement (I) designates the one or more concave portions that have a maximum height difference of 0.5 μm or more. The "one or more concave portions" defined in the requirement (I) suffices that a point having a height difference of 0.5 μm or more is present at any position of the concave portion, and it is not necessary that the height difference is present over the entire region of the one or more concave portions.

It is preferred that plural concave portions that each satisfy the requirement (I) are present.

The determination as to whether or not plural concave portions that each satisfy the requirement (I) are present may be made by observing a region (P) surrounded by a square having an edge length of 5 mm that is arbitrarily selected on the surface (α) of the resin layer of the pressure sensitive adhesive sheet, with an electron microscope, and more specifically can be made by the method described in the examples described later.

The maximum value of the height difference of one concave portion is more preferably 1.0 μm or more and the thickness of the resin layer or less, further preferably 3.0 μm or more and the thickness of the resin layer or less, and still further preferably 5.0 μm or more and the thickness of the resin layer or less, from the standpoint of enhancing the air escape property of the pressure sensitive adhesive sheet, the standpoint of retaining the good appearance of the pressure sensitive adhesive sheet, and the standpoint of the dimensional stability of the pressure sensitive adhesive sheet.

The ratio of the maximum value of the values of the height difference of the plural concave portions present in the region (P) and the thickness of the resin layer ((maximum value of height difference)/(thickness of resin layer)) is preferably from 1/100 to 100/100, more preferably from 5/100 to 99/100, further preferably from 10/100 to 96/100, and still further preferably from 15/100 to 90/100.

The average value of the widths of the one or more concave portions is preferably from 1 to 500 μm, more preferably from 3 to 400 μm, and further preferably from 5 to 300 μm, from the standpoint of enhancing the air escape property of the pressure sensitive adhesive sheet, and the standpoint of improving the pressure sensitive adhesiveness of the pressure sensitive adhesive sheet.

In the present invention, the width of the concave portion means the distance between the maximum points of the two peaks, and in the concave portion 13 shown in FIG. 2(*a*), the width means the distance L between the peak ($M_1$) and the peak ($M_2$). In the concave portion 131 shown in FIG. 2(*b*), the width means the distance $L_1$ between the peak ($M_{11}$) and the peak ($M_{12}$), and in the concave portion 132 shown therein, the width means the distance $L_2$ between the peak ($M_{13}$) and the peak ($M_{12}$).

In the case where the concave portion has a short edge and a long edge in the plan view of the pressure sensitive adhesive sheet (i.e., viewed from the above), the short edge is referred to as the width.

The ratio the maximum value of the height differences of the one concave portion and the average value of the width thereof ((maximum value of height difference)/(average value of width)) (which is "h/L" in the concave portion 13 shown in FIG. 2(*a*)) is preferably from 1/500 to 100/1, more preferably from 3/400 to 70/3, and further preferably 1/60 to 10/1, from the standpoint of enhancing the air escape property of the pressure sensitive adhesive sheet, and the standpoint of improving the pressure sensitive adhesiveness of the pressure sensitive adhesive sheet.

Requirement (II)

In the pressure sensitive adhesive sheet according of the present invention, it is preferred that the surface (α) has thereon the plural concave portions, and 95% or more of the one or more concave portions have shapes that are different from each other, according to the requirement (II).

When the plural concave portions satisfying the requirement (II) are present on the surface (α) of the resin layer, a pressure sensitive adhesive sheet that is enhanced in the features including the air escape property, the appearance, the pressure sensitive adhesion characteristics, the punching property, and the like in a well-balanced manner can be obtained.

In the pressure sensitive adhesive sheet according to one embodiment of the present invention, the proportion of the plural concave portions that have shapes that are different from each other present on the surface (α) of the resin layer is more preferably 98% or more, and further preferably 100%, with respect to the total number (100%) of the concave portions present in the surface (α).

In the present invention, the determination as to whether or not the requirement (II) is satisfied may be made in the following manner. The shapes of the plural concave portions present in a region (P) surrounded by a square having an edge length of 5 mm that is arbitrarily selected on the surface (α) of the resin layer of the target pressure sensitive adhesive sheet are observed with an electron microscope (magnification: 30 to 100), and in the case where the number of the one or more concave portions having shapes that are different from each other is 95% or more (more preferably 98% or more, and further preferably 100%) with respect to the total number of the plural concave portions observed in the region (P), it is determined that the pressure sensitive adhesive sheet satisfies the requirement (II). The observation of the shapes of the plural concave portion may be a method of directly observing with an electron microscope with the aforementioned magnification, or may be such a method that an image is obtained by using an electron microscope with the aforementioned magnification, and the shapes of the one or more concave portions shown in the image are visually observed. More specifically, the determination may be made by the method described in the examples described later.

The state that "the number of the one or more concave portions having shapes that are different from each other is 100%" herein means that "all the plural concave portions observed in the region (P) have shapes that are different from each other".

In the description herein, the one or more concave portions that are continuously connected to each other without interruption within the selected region (P) are counted as "one concave portion". However, for example, even though two concave portions present in the selected region are connected to each other at the position in another region adjacent to the selected region to form one concave portion, the two concave portions are counted independently within the selected region.

Requirement (III)

Figure 3:
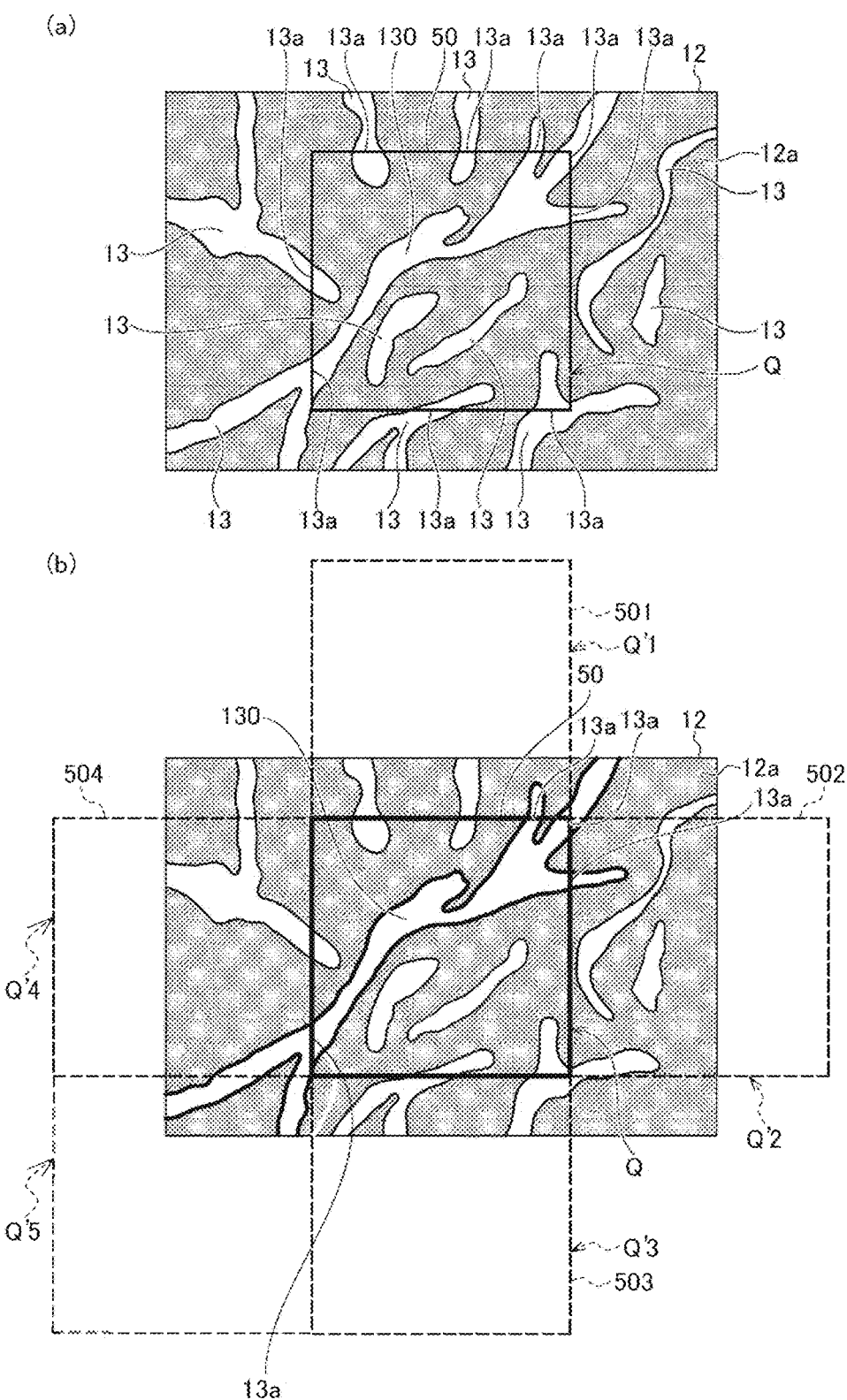
FIG. 3 is a schematic plan view of a surface (α) showing an example of the surface (α) of the resin layer of the pressure sensitive adhesive sheet of the present invention.

FIGS. 3(*a*) and 3(*b*) are schematic plan views of a surface (α) showing an example of the surface (α) of the resin layer of the pressure sensitive adhesive sheet according to one embodiment of the present invention. As shown in FIG. 3(*a*), the surface (α) 12*a* of the resin layer 12 of the pressure sensitive adhesive sheet of the present invention preferably has thereon plural concave portions 13 and 130.

In the pressure sensitive adhesive sheet of the present invention, it is preferred that one or more of the concave portions 13 and 130 are present in a region (Q) surrounded by a square 50 having an edge length of 1 mm that is arbitrarily selected on the surface (α) 12*a*, according to the requirement (III). For example, in FIG. 3(*a*), 8 concave portions are present in the region (Q).

When the surface (α) has one or more of the one or more concave portions in the region (Q) thereon, the air escape property of the pressure sensitive adhesive sheet can be improved.

In the present invention, the number of the one or more concave portion present in the region (Q) on the surface (α) is preferably 1 or more, is more preferably 2 or more, and further preferably 3 or more, from the aforementioned standpoint, and is preferably 1,000 or less, and more preferably 500 or less, from the standpoint of retaining the good appearance and the good pressure sensitive adhesion characteristics.

From the standpoint of enhancing the air escape property of the pressure sensitive adhesive sheet, it is preferred that one or more of the concave portions 13 and 130 present in the region (Q) on the surface (α) 12a of the resin layer 12 of the pressure sensitive adhesive sheet according to one embodiment of the present invention extends to any of the edges of the square 50 having an edge length of 1 mm, which are the boundary lines of the region (Q), as shown in FIG. 3(a).

On the surface (α) 12a of the resin layer 12 of the pressure sensitive adhesive sheet shown in FIG. 3(a), there are 9 intersecting points 13a of the extending concave portions 13 and 130 and the any of the edges of the square 50 having an edge length of 1 mm, which are the boundary lines of the region (Q).

The number of the intersecting point of the one or more concave portions and any of the edges of the square having an edge length of 1 mm, which are the boundary lines of the region (Q), is preferably 1 or more, more preferably 2 or more, and further preferably 3 or more.

From the standpoint of further enhancing the air escape property of the pressure sensitive adhesive sheet, it is preferred that one or more of the concave portions present in the region (Q) on the surface (α) of the resin layer of the pressure sensitive adhesive sheet according to one embodiment of the present invention has a shape that continuously extends into 1 or more of other regions (Q') surrounded by a square having an edge length of 1 mm adjacent to the region (Q), more preferably a shape that continuously extends into 2 or more of other regions (Q'), and further preferably a shape that continuously extends into 3 or more of other regions (Q').

For example, as in FIG. 3(b), on focusing on the region (Q) surrounded by a square 50 having an edge length of 1 mm that is arbitrarily selected on the surface (α) 12a of the resin layer 12, the "region (Q') surrounded by a square having an edge length of 1 mm adjacent to the region (Q)" means the region (Q'1) surrounded by a square 501 having an edge length of 1 mm, the region (Q'2) surrounded by a square 502 having an edge length of 1 mm, the region (Q'3) surrounded by a square 503 having an edge length of 1 mm, and the region (Q'4) surrounded by a square 504 having an edge length of 1 mm.

Further, on focusing on the "concave portion 130" present on the surface (α) 12a of the resin layer 12 shown in FIG. 3(b), the "concave portion 130" is present in the region (Q) surrounded by a square 50 having an edge length of 1 mm, and has a shape that extends into the region (Q'1) surrounded by a square 501 having an edge length of 1 mm, the region (Q'2) surrounded by a square 502 having an edge length of 1 mm, and the region (Q'4) surrounded by a square 504 having an edge length of 1 mm, which are adjacent to the region (Q).

In the case where the one or more concave portions having shapes that not only are present in the region (Q), but also extend to the other region (Q') adjacent to the region (Q) are present on the surface (α), as the "concave portion 130" shown in FIG. 3(b), the pressure sensitive adhesive sheet that is further enhanced in the air escape property can be obtained.

It is preferred that the one or more concave portion present in the region (Q) on the surface (α) of the resin layer have shapes that continuously extend not only to 1 or more of other regions (Q') adjacent to the region (Q), but also to a region (Q") that are adjacent to the region (Q') but is not the region (Q).

For example, the "concave portion 130" shown in FIG. 3(b) has a shape that extends not only to the region (Q'4) adjacent to the region (Q), but also to the region (Q'5) adjacent to the region (Q'4).

Requirement (IV)

In the pressure sensitive adhesive sheet according to one embodiment of the present invention, it is preferred that the positions where the plural concave portions are present on the surface (α) of the resin layer of the pressure sensitive adhesive sheet have no periodicity, from the standpoint of providing the pressure sensitive adhesive sheet that is enhanced in the features including the air escape property, the appearance, the pressure sensitive adhesion characteristics, the punching property, and the like in a well-balanced manner.

In the present invention, the state that "the positions where the plural concave portions are present have no periodicity" means that the plural concave portions do not have the same repeating patterns, but are present randomly. Accordingly, this means that it is different from the state that the one or more concave portions are "disposed" based on a certain regularity, such as the grooves described in PTL 1, i.e., the grooves formed by transferring an emboss pattern by pressing a release material having an emboss pattern formed on the surface thereof onto the surface of the resin layer.

The determination as to whether or not "the positions where the plural concave portions are present have no periodicity" is made in principle by observing the positions of the plural concave portions present on the surface (α) of the resin layer of the target pressure sensitive adhesive sheet visually or with a digital microscope (magnification: 30 to 100).

However, the determination may be made in such a manner that 10 regions (R) each surrounded by a square having an edge length of 4 mm that are arbitrarily selected on the surface (α) are selected, and the "positions of the plural concave portions" present in the respective regions (R) are observed visually or with a digital microscope (magnification: 30 to 100). Specifically, in the case where the "positions of the plural concave portions" present in the respective regions have no periodicity in all the 10 regions selected, it can be assumed that the target pressure sensitive adhesive sheet satisfies the requirement (IV).

The aforementioned observation may be a method of directly observing with a digital microscope with the aforementioned magnification, or may be such a method that an image is obtained by using a digital microscope with the aforementioned magnification, and the positions where the one or more concave portions are present shown in the image are visually observed.

From the standpoint of providing the pressure sensitive adhesive sheet that is enhanced in the features including the air escape property, the appearance, the pressure sensitive adhesion characteristics, the punching property, and the like in a well-balanced manner, the attached surface on the surface (α) of the resin layer of the pressure sensitive adhesive sheet according to one embodiment of the present invention has an irregular shape.

In the present invention, the "attached surface on the surface (α)" is the surface except for the regions occupied by the plural concave portions on the surface (α) of the resin layer, and means the surface attached to an adherend on attaching to the adherend. FIG. 3(a) shows a schematic plan view of the surface (α) showing an example of the surface (α) of the resin layer of the pressure sensitive adhesive sheet according to one embodiment of the present invention, in which the "attached surface" shows the hatched regions except for the plural concave portions 13 on the surface (α) 12a of the resin layer shown in FIG. 3.

The "irregular shape" means the state where the shape does not have a specific shape, such as a shape surrounded only by a circle or a straight line (e.g., a triangular shape and a rectangular shape), and does not have regularity, as shown by the hatched regions on the surface (α) 12a of the resin layer shown in FIG. 3(a), and the shape of the attached surface that is formed by transferring an emboss pattern, for example, formed by pressing a release material having an emboss pattern onto the surface of the resin layer, is excluded.

In other words, it is considered that in the pressure sensitive adhesive sheet satisfying the requirement (II), the shape of the attached surface on the surface (α) is an irregular shape.

The determination as to whether or not "the shape of the attached surface on the surface (α) is an irregular shape" is made in principle by observing the shape of the attached surface on the surface (α) of the resin layer of the target pressure sensitive adhesive sheet visually or with a digital microscope (magnification: 30 to 100).

However, the determination may be made by selecting 10 regions (R) surrounded by a square having an edge length of 4 mm arbitrarily selected on the surface (α), and observing the "shape of the attached region" in each of the regions (R) visually or with a digital microscope (magnification: 30 to 100). Specifically, in the case where it is found that in each of the selected 10 regions, the "shape of the attached surface" in the region is an irregular shape, it can be assumed in the target pressure sensitive adhesive sheet that the "shape of the attached surface on the surface (α) is an irregular shape".

The aforementioned observation of the attached surface may be a method of directly observing with a digital microscope with the aforementioned magnification, or may be such a method that an image is obtained by using a digital microscope with the aforementioned magnification, and the shape of the attached surface shown in the image is visually observed.

The components of the pressure sensitive adhesive sheet of the present invention will be described.

Substrate

The substrate used in one embodiment of the present invention is not particularly limited, and examples thereof include a paper substrate, a resin film or sheet, and a substrate containing a paper substrate laminated with a resin, which may be appropriately selected depending on the purpose of the pressure sensitive adhesive sheet according to one embodiment of the present invention.

Examples of paper constituting the paper substrate include thin paper, medium quality paper, wood-free paper, impregnated paper, coated paper, art paper, parchment paper, and glassine paper.

Examples of the resin constituting the resin film or sheet include a polyolefin resin, such as polyethylene and polypropylene; a vinyl resin, such as polyvinyl chloride, polyvinylidene chloride, polyvinyl alcohol, an ethylene-vinyl acetate copolymer, and an ethylene-vinyl alcohol copolymer; a polyester resin, such as polyethylene terephthalate, polybutylene terephthalate, and polyethylene naphthalate; polystyrene; an acrylonitrile-butadiene-styrene copolymer; cellulose triacetate; polycarbonate; an urethane resin, such as polyurethane and acrylic-modified polyurethane; polymethylpentene; polysulfone; polyether ether ketone; polyether sulfone; polyphenylenesulfide; a polyimide resin, such as polyether imide and polyimide; a polyamide resin; an acrylic resin; and a fluorine resin.

Examples of the substrate containing a paper substrate laminated with a resin include laminated paper containing the aforementioned paper substrate laminated with a thermoplastic resin, such as polyethylene.

Among these substrates, a resin film or sheet is preferred, a film or sheet formed of a polyester resin is more preferred, and a film or sheet formed of polyethylene terephthalate (PET) is further preferred.

In the case where the pressure sensitive adhesive sheet of the present invention is applied to a purpose that requires heat resistance, a film or sheet constituted by a resin selected from polyethylene naphthalate and a polyimide resin is preferred, and in the case where the pressure sensitive adhesive sheet is applied to a purpose that requires weather resistance, a film or sheet constituted by a resin selected from polyvinyl chloride, polyvinylidene chloride, an acrylic resin, and a fluorine resin is preferred.

The thickness of the substrate may be appropriately determined depending on the purpose of the pressure sensitive adhesive sheet of the present invention, and is preferably from 5 to 1,000 μm, more preferably from 10 to 500 μm, further preferably from 12 to 250 μm, and still further preferably from 15 to 150 μm, from the standpoint of the handleability and the economic efficiency.

The substrate may further contain various additives, such as an ultraviolet ray absorbent, a light stabilizer, an antioxidant, an antistatic agent, a slipping agent, an antiblocking agent, and a colorant.

The substrate used in one embodiment of the present invention is preferably a non-air permeable substrate from the standpoint of enhancing the blister resistance of the resulting pressure sensitive adhesive sheet, and specifically a substrate containing the aforementioned resin film or sheet having a metal layer on the surface thereof.

Examples of the metal forming the metal layer include a metal having metallic gloss, such as aluminum, tin, chromium, and titanium.

Examples of the method of forming the metal layer include a method of vapor-depositing the metal by a PVD method, such as vacuum vapor deposition, sputtering, and ion plating, and a method of attaching a metal foil formed of the metal with an ordinary pressure sensitive adhesive, and a method of vapor-depositing the metal by a PVD method is preferred.

In the case where a resin film or sheet is used as the substrate, the surface of the resin film or sheet may be subjected to a surface treatment by an oxidizing method, a roughening method, and the like, or may be subjected to a primer treatment, from the standpoint of enhancing the adhesion to the resin layer to be laminated on the resin film or sheet.

Examples of the oxidizing method include a corona discharge treatment, a plasma discharge treatment, a chromic acid treatment (wet process), a hot air treatment, and an ozone treatment, and an ultraviolet ray irradiation treatment, and examples of the roughening treatment include a sand blasting treatment and a solvent treatment.

Release Material

The release material used in one embodiment of the present invention may be a release sheet having both surfaces subjected to a release treatment, and a release sheet having one surface subjected to a release treatment, and examples thereof include a substrate for the release material having coated thereon a release agent. The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet according to one embodiment of the present invention.

Examples of the release agent include a rubber elastomer, such as a silicone resin, an olefin resin; an isoprene resin, and a butadiene resin, a long-chain alkyl resin, an alkyd resin, and a fluorine resin.

The thickness of the release material is not particularly limited, and is preferably from 10 to 200 μm, more preferably from 25 to 170 μm, and further preferably from 35 to 80 μm.

Resin Layer

The resin layer of the pressure sensitive adhesive sheet of the present invention may contain a resin part (X) containing a resin as a main component, and a particle part (Y) consisting of fine particles.

In the resin layer of the pressure sensitive adhesive sheet of the present invention, at least the surface (α) of the resin layer being opposite to the side of the substrate or being opposite to the side of the release material provided has pressure sensitive adhesiveness, and the surface (β) of the resin layer on the side with the substrate or the release material provided may also have pressure sensitive adhesiveness.

Examples of the resin layer include a structure of the layer having formed therein a multilayer structure having a layer (Xβ) mainly containing the resin part (X), a layer (Y1) containing 15% by mass or more of the particle part (Y), and a layer (Xα) mainly containing the resin part (X), laminated in this order from the side of the substrate or the release material, as the pressure sensitive adhesive sheets 1a to 2b in FIG. 1.

In the aforementioned multilayer structure, the boundary between the layer (Xβ) and the layer (Y1) and/or the boundary between the layer (Y1) and the layer (Xα) may not be distinct and may form a mixed layer.

The layer (Xα) and the layer (Xβ) each are a layer mainly containing the resin part (X), and may contain the particle part (Y). However, the contents of the particle part (Y) in the layer (Xα) and the layer (Xβ) each are independently less than 15% by mass based on the total mass (100%) of the layer (Xα) or the layer (Xβ), and is smaller than the content of the resin constituting the resin part (X).

The layer (Xα) and the layer (Xβ) each may contain a void part (Z) described later, in addition to the resin part (X) and the particle part (Y).

The contents of the resin in the layer (Xα) and the layer (Xβ) each are independently generally from 50 to 100% by mass, preferably from 65 to 100% by mass, more preferably from 75 to 100% by mass, further preferably from 85 to 100% by mass, and still further preferably from 90 to 100% by mass, based on the total mass (100% by mass) of the layer (Xα) or the layer (Xβ).

In the present invention, the "content of the resin in the layer (Xα) and the layer (Xβ)" can be assumed to be the content of the resin based on the total mass (100% by mass, except for a diluting solvent) of the resin composition as a formation material of the layer (Xα) or the layer (Xβ).

The contents of the fine particles constituting the particle part (Y) in the layer (Xα) and the layer (Xβ) each are independently preferably less than 15% by mass, more preferably from 0 to 13% by mass, further preferably from 0 to 10% by mass, still further preferably from 0 to 5% by mass, and still more further preferably 0% by mass, based on the total mass (100% by mass) of the layer (Xα) or the layer (Xβ).

In the present invention, the "content of the fine particles in the layer (Xα) or the layer (Xβ)" can be assumed to be the content of the fine particles based on the total amount (100% by mass, except for a diluting solvent) of the resin composition as a formation material of the layer (Xα) or the layer (Xβ).

The layer (Xα) and the layer (Xβ) are preferably layers formed of compositions (xα) and (xβ) each containing a resin as a main component described later, respectively.

The layer (Y1) containing 15% by mass or more of the particle part (Y) may be a layer that contains only the particle part (Y), or a layer that contains the resin part (X) along with the particle part (Y), and may further contain a void part (Z) described later.

The content of the fine particles constituting the particle part (Y) in the layer (Y1) is 15% by mass or more, and is preferably from 20 to 100% by mass, more preferably from 25 to 90% by mass, further preferably from 30 to 85% by mass, and still further preferably from 35 to 80% by mass, based on the total mass (100% by mass) of the layer (Y1).

In the present invention, the "content of the fine particles in the layer (Y1)" can be assumed to be the content of the fine particles based on the total amount (100% by mass, except for a diluting solvent) of the composition as a formation material of the layer (Y1).

The content of the resin in the layer (Y1) is generally from 1 to 85% by mass, preferably from 5 to 80% by mass, more preferably from 10 to 75% by mass, further preferably from 20 to 70% by mass, and still further preferably from 25 to 65% by mass, based on the total mass (100% by mass) of the layer (Y1).

In the present invention, the "content of the resin in the layer (Y1)" can be assumed to be the content of the resin based on the total amount (100% by mass, except for a diluting solvent) of the composition as a formation material of the layer (Y1).

The layer (Y1) is preferably a layer formed of a composition (y) containing 15% by mass or more of fine particles described later.

The resin layer of the pressure sensitive adhesive sheet according to one embodiment of the present invention preferably has a void part (Z) in addition to the resin part (X) and the particle part (Y). The void part (Z) in the resin layer can enhance the blister resistance of the pressure sensitive adhesive sheet.

The void part (Z) includes voids present among the fine particles, and in the case where the fine particles are secondary particles, also includes voids present inside the secondary particles.

In the case where the resin layer has a multilayer structure, even when the void part (Z) is present during the formation of the resin layer or immediately after the formation thereof, there are cases where the void is lost by flowing the resin part (X) into the void part (Z) to provide the resin layer that has no void part (Z).

However, even in the case where the void part (Z) present for a while in the resin layer is lost, the resin layer of the pressure sensitive adhesive sheet according to one embodiment of the present invention has the one or more concave portions on the surface (α) thereof, and thus can be excellent in air escape property and blister resistance.

The shear storage modulus at 100° C. of the resin layer of the pressure sensitive adhesive sheet according to one embodiment of the present invention is preferably $9.0 \times 10^3$ Pa or more, more preferably $1.0 \times 10^4$ Pa or more, and further preferably $2.0 \times 10^4$ Pa or more, from the standpoint of enhancing the air escape property and the blister resistance of the pressure sensitive adhesive sheet.

In the present invention, the shear storage modulus at 100° C. of the resin layer means a value that is measured by using a viscoelasticity measuring instrument (Dynamic Analyzer RDA II, a product name, produced by Rheometrics, Inc.) at a frequency of 1 Hz.

The thickness of the resin layer is preferably from 1 to 300 μm, more preferably from 5 to 150 μm, and further preferably from 10 to 75 μm.

The pressure sensitive adhesive strength of the surface (α) of the resin layer of the pressure sensitive adhesive sheet according to one embodiment of the present invention is preferably 0.5 N/25 mm or more, more preferably 2.0 N/25 mm or more, further preferably 3.0 N/25 mm or more, still further preferably 4.0 N/25 mm or more, and still more further preferably 7.0 N/25 mm or more.

In the case where the surface (β) of the resin layer has pressure sensitive adhesiveness, the pressure sensitive adhesive strength of the surface (β) is preferably in the aforementioned range.

The value of the pressure sensitive adhesive strength of the pressure sensitive adhesive sheet means a value that is measured by the method described in the examples described later.

Resin Part (X)

The resin part (X) constituting the resin layer contains a resin as a main component.

In the present invention, the resin part (X) is a part that contains the other components than the fine particles contained in the resin layer, and is distinguished from the particle part (Y) in this point of view.

The resin part (X) contains a resin as a main component, and may contain a crosslinking agent and a general additive in addition to the resin.

The content of the resin in the resin part (X) is generally 40% by mass or more, preferably 50% by mass or more, more preferably 65% by mass or more, further preferably 75% by mass or more, still further preferably 85% by mass or more, and still more further preferably 90% by mass or more, and is preferably 100% by mass or less, and more preferably 99.9% by mass or less, based on the total amount (100% by mass) of the resin part (X).

In the present invention, the value of the content of the resin in the resin composition as a formation material of the resin part (X) can be assumed to be the "content of the resin in the resin part (X)".

From the standpoint of exhibiting pressure sensitive adhesiveness on the surface (α) of the resin layer formed, the resin contained in the resin part (X) preferably contains a pressure sensitive adhesive resin.

In the case where the resin layer has the multilayer structure containing the layer (XI), the layer (Y1), and the layer (Xα), laminated in this order from the side with the substrate or the release material provided, as in the pressure sensitive adhesive sheets 1a to 2b in FIG. 1, at least the layer (Xα) preferably contains a pressure sensitive adhesive resin from the aforementioned standpoint.

Examples of the pressure sensitive adhesive resin include an acrylic resin, a urethane resin, a rubber resin, and a silicone resin.

Among these pressure sensitive adhesive resins, an acrylic resin is preferably contained from the standpoint of the good pressure sensitive adhesion characteristics and the good weather resistance thereof, and the standpoint of facilitating the formation of the one or more concave portions of irregular shapes on the surface (α) of the resin layer formed.

The content of the acrylic resin is preferably 25 to 100% by mass, more preferably from 50 to 100% by mass, further preferably from 70 to 100% by mass, still further preferably from 80 to 100% by mass, and still more further preferably 100% by mass, based on the total amount (100% by mass) of the resin in the resin part (X).

From the standpoint of facilitating the formation of the one or more concave portions of irregular shapes on the surface (α) of the resin layer formed, the resin part (X) preferably contains the resin that has a functional group, and more preferably contains an acrylic resin that has a functional group.

In particular, in the case where the resin layer has the multilayer structure containing the layer (Xβ), the layer (Y1), and the layer (Xα), laminated in this order from the side with the substrate or the release material provided, as in the pressure sensitive adhesive sheets 1a to 2b in FIG. 1, at least the layer (Y1) preferably contains the resin that has a functional group.

The functional group is a group functioning as a starting point of crosslinking to a crosslinking agent, examples of which include a hydroxyl group, a carboxyl group, an epoxy group, an amino group, a cyano group, a keto group, and an alkoxysilyl group, and a carboxyl group is preferred.

The resin part (X) preferably further contains a crosslinking agent in addition to the resin that has a functional group. In particular, in the case where the resin layer has the aforementioned multilayer structure, in at least the layer (Y1) preferably contains the resin that has a functional group, and a crosslinking agent.

Examples of the crosslinking agent include an isocyanate crosslinking agent, an epoxy crosslinking agent, an aziridine crosslinking agent, and a metal chelate crosslinking agent.

Examples of the isocyanate crosslinking agent include an aromatic polyisocyanate, such as tolylene diisocyanate, diphenylmethane diisocyanate, and xylylene diisocyanate; an aliphatic polyisocyanate, such as hexamethylene diisocyanate; an alicyclic polyisocyanate, such as isophorone diisocyanate and hydrogenated diphenylmethane diisocyanate; and a biuret thereof, an isocyanurate thereof, and an adduct thereof, which is a reaction product thereof with a low molecular weight active hydrogen-containing compound (such as ethylene glycol, propylene glycol, neopentyl glycol, trimethylolpropane, and castor oil).

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, and diglycidylamine.

Examples of the aziridine crosslinking agent include diphenylmethane-4,4'-bis(1-aziridinecarboxyamide), trimethylolpropane tri-β-aziridinylpropionate, tetramethylolmethane tri-β-adiridinylpropionate, toluene-2,4-bis(1-aziridinecarboxiamide), triethylenemelamine, bisisophthaloyl-1-(2-methylaziridine), tris-1-(2-methylaziridine)phosphine, and trimethylolpropane tri-β-(2-methylaziridine)propionate.

Examples of the metal chelate crosslinking agent include chelate compounds having aluminum, zirconium, titanium, zinc, iron, tin, or the like as the metal atom, and an aluminum chelate crosslinking agent is preferred.

Examples of the aluminum chelate crosslinking agent include diisopropoxy aluminum monooleylacetoacetate, monoisopropoxy aluminum bisoleylacetoacetate, monoisopropoxy aluminum monooleate monoethylacetoacetate, diisopropoxy aluminum monolaurylacetoacetate, diisopropoxy aluminum monostearylacetoacetate, and diisopropoxy aluminum monoisostearylacetoacetate.

The crosslinking agent may be used solely or as a combination of two or more kinds thereof.

Among these, from the standpoint of facilitating the formation of the one or more concave portions of irregular shapes on the surface (α) of the resin layer formed, one or more selected from a metal chelate crosslinking agent, an epoxy crosslinking agent, and an aziridine crosslinking agent is preferably contained, a metal chelate crosslinking agent is more preferably contained, and an aluminum chelate crosslinking agent is further preferably contained, in the resin part (X).

The content of the crosslinking agent is preferably from 0.01 to 15 parts by mass, more preferably from 0.1 to 10 parts by mass, and further preferably from 0.3 to 7.0 parts by mass, per 100 parts by mass of the resin that has a functional group.

Form the standpoint of improving the shape retention property of the plural concave portions on the surface (α) of the resin layer, the resin part (X) preferably contains both a metal chelate crosslinking agent and an epoxy crosslinking agent.

In the case where the resin part (X) contains both a metal chelate crosslinking agent and an epoxy crosslinking agent, from the aforementioned standpoint, the content ratio of the metal chelate crosslinking agent and the epoxy crosslinking agent ((metal chelate crosslinking agent)/(epoxy crosslinking agent)) is preferably from 10/90 to 99.5/0.5, more preferably from 50/50 to 99.0/1.0, further preferably from 65/35 to 98.5/1.5, and still further preferably from 75/25 to 98.0/2.0, in terms of part by mass.

The resin part (X) may contain a general additive.

Examples of the general additive include a tackifier, an antioxidant, a softening agent (plasticizer), a rust preventing agent, a pigment, a dye, a retarder, a reaction accelerator, and an ultraviolet ray absorbent.

The general additive may be used solely or as a combination of two or more kinds thereof.

In the case where the general additive is contained, the contents of the respective general additives each is preferably from 0.0001 to 60 parts by mass, and more preferably from 0.001 to 50 parts by mass, per 100 parts by mass of the resin.

The resin contained in the resin part (X) may be only one kind or a combination of two or more kinds thereof.

The formation material of the resin part (X) of the resin layer of the pressure sensitive adhesive sheet of the present invention is preferably a pressure sensitive adhesive containing a pressure sensitive adhesive resin having a functional group, more preferably an acrylic pressure sensitive adhesive containing an acrylic resin having a functional group (A) (which may be hereinafter referred simply to as an "acrylic resin (A)"), and further preferably an acrylic pressure sensitive adhesive containing an acrylic resin (A) having a functional group, and a crosslinking agent (B).

The acrylic pressure sensitive adhesive may be any of a solvent type and an emulsion type.

The acrylic pressure sensitive adhesive that is preferred as the formation material of the resin part (X) will be described.

Examples of the acrylic resin (A) contained in the acrylic pressure sensitive adhesive include a polymer having a structural unit derived from an alkyl (meth)acrylate having a linear or branched alkyl group, and a polymer having a structural unit derived from a (meth)acrylate having a cyclic structure.

The mass average molecular weight (Mw) of the acrylic resin (A) is preferably from 50,000 to 1,500,000, more preferably from 150,000 to 1,300,000, further preferably from 250,000 to 1,100,000, and still further preferably from 350,000 to 900,000.

The acrylic resin (A) preferably contains an acrylic copolymer (A1) having a structural unit (a1) derived from an alkyl (meth)acrylate having an alkyl group having from 1 to 18 carbon atoms (a1') (which may be hereinafter referred to as a "monomer (a1')"), and a structural unit (a2) derived from a functional group-containing monomer (a2') (which may be hereinafter referred to as a "monomer (a2')"), and is more preferably the acrylic copolymer (A1).

The content of the acrylic copolymer (A1) is preferably from 50 to 100% by mass, more preferably from 70 to 100% by mass, further preferably from 80 to 100% by mass, and still further preferably from 90 to 100% by mass, based on the total amount (100% by mass) of the acrylic resin (A) in the acrylic pressure sensitive adhesive.

The mode of copolymerization of the acrylic copolymer (A1) is not particularly limited, and may be any of a block copolymer, a random copolymer, and a graft copolymer.

The number of carbon atoms of the alkyl group of the monomer (a1') is more preferably from 4 to 12, further preferably from 4 to 8, and still further preferably from 4 to 6, from the standpoint of enhancing the pressure sensitive adhesion characteristics.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, and stearyl (meth)acrylate.

Among these, butyl (meth)acrylate and 2-ethylhexyl (meth)acrylate are preferred and butyl (meth)acrylate is more preferred.

The content of the structural unit (a1) is preferably from 50 to 99.5% by mass, more preferably from 60 to 99% by mass, further preferably from 70 to 95% by mass, and still further preferably from 80 to 93% by mass, based on the total constitutional unit (100% by mass) of the acrylic copolymer (A1).

Examples of the monomer (a2') include a hydroxyl group-containing monomer, a carboxyl group-containing monomer, an epoxy group-containing monomer, an amino group-containing monomer, a cyano group-containing monomer, a keto group-containing monomer, and an alkoxysilyl group-containing monomer.

Among these, a carboxyl group-containing monomer is preferred.

Examples of the carboxyl group-containing monomer include (meth)acrylic acid, maleic acid, fumaric acid, and itaconic acid, and (meth)acrylic acid is preferred.

The content of the structural unit (a2) is preferably from 0.5 to 50% by mass, more preferably from 1 to 40% by mass, further preferably from 5 to 30% by mass, and still further preferably from 7 to 20% by mass, based on the total constitutional unit (100% by mass) of the acrylic copolymer (A1).

The acrylic copolymer (A1) may have a structural unit (a3) derived from an additional monomer (a3'), in addition to the monomers (a1') and (a2').

Examples of the additional monomer (a3') include a (meth)acrylate having a cyclic structure, such as a cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, and imide (meth)acrylate; vinyl acetate, acrylonitrile, and styrene.

The content of the structural unit (a3) is preferably from 0 to 30% by mass, more preferably from 0 to 20% by mass, further preferably from 0 to 10% by mass, and still further preferably from 0 to 5% by mass, based on the total constitutional unit (100% by mass) of the acrylic copolymer (A1).

The monomers (a1') to (a3') each may be used solely or as a combination of two or more kinds thereof.

The synthesis method of the acrylic copolymer (A1) is not particularly limited, and may be produced in such a manner as a method of dissolving the raw material monomer in a solvent and performing solution polymerization in the presence of a polymerization initiator, a chain transfer agent, and the like, a method of performing emulsion polymerization of the raw material monomer in an aqueous system in the presence of an emulsifier, a polymerization initiator, a chain transfer agent, a dispersant, and the like.

Examples of the crosslinking agent (B) contained in the acrylic pressure sensitive adhesive include those described above, and from the standpoint of improving the pressure sensitive adhesion characteristics and the standpoint of facilitating the formation of the one or more concave portions of irregular shapes on the surface (α) of the resin layer formed, the crosslinking agent preferably contains one or more selected from a metal chelate crosslinking agent and an epoxy crosslinking agent, more preferably contains a metal chelate crosslinking agent, and further preferably contains an aluminum chelate crosslinking agent.

Form the standpoint of improving the shape retention property of the plural concave portions on the surface (α) of the resin layer, the crosslinking agent (B) preferably contains both a metal chelate crosslinking agent and an epoxy crosslinking agent.

The content of the crosslinking agent (B) is preferably from 0.01 to 15 parts by mass, more preferably from 0.1 to 10 parts by mass, and further preferably from 0.3 to 7.0 parts by mass, per 100 parts by mass of the acrylic resin (A) in the acrylic pressure sensitive adhesive.

In the case where a metal chelate crosslinking agent and an epoxy crosslinking agent are used in combination, the content ratio of the metal chelate crosslinking agent and the epoxy crosslinking agent ((metal chelate crosslinking agent)/(epoxy crosslinking agent)) is preferably from 10/90 to 99.5/0.5, more preferably from 50/50 to 99.0/1.0, further preferably from 65/35 to 98.5/1.5, and still further preferably from 75/25 to 98.0/2.0, in terms of part by mass.

The acrylic pressure sensitive adhesive used in one embodiment of the present invention may contain a general additive in such a range that does not impair the advantageous effects of the present invention. Examples of the general additive include those described above, and the content of the general additive is as described above.

The acrylic pressure sensitive adhesive used in one embodiment of the present invention may contain a pressure sensitive adhesive resin other than the acrylic resin (A) (such as an urethane resin, a rubber resin, and a silicone resin) in such a range that does not impair the advantageous effects of the present invention.

The content of the acrylic resin (A) in the acrylic pressure sensitive adhesive is preferably from 50 to 100% by mass, more preferably from 70 to 100% by mass, further preferably from 80 to 100% by mass, and still further preferably 100% by mass, based on the total amount (100% by mass) of the pressure sensitive adhesive resin contained in the acrylic pressure sensitive adhesive.

Particle Part (Y)

The particle part (Y) constituting the resin layer consists of fine particles.

The average particle diameter of the fine particles is preferably from 0.01 to 100 μm, more preferably from 0.05 to 25 μm, and further preferably from 0.1 to 10 μm, from the standpoint of enhancing the air escape property and the blister resistance of the pressure sensitive adhesive sheet, and the standpoint of facilitating the formation of the one or more concave portions of irregular shapes on the surface (α) of the resin layer formed.

The fine particles used in one embodiment of the present invention are not particularly limited, and examples thereof include inorganic particles, such as silica particles, metal oxide particles, barium sulfate, calcium carbonate, magnesium carbonate, glass beads, and smectite, and organic particles, such as acrylic beads.

Among these fine particles, one or more selected from silica particles, metal oxide particles, and smectite is preferred, and silica particles are more preferred.

The silica particles used in one embodiment of the present invention may be any of dry silica and wet silica.

The silica particles used in one embodiment of the present invention may be organic modified silica subjected to surface modification with an organic compound having a reactive functional group, and the like; inorganic modified silica subjected to a surface treatment with an inorganic compound, such as sodium aluminate and sodium hydroxide; organic-inorganic modified silica subjected to a surface treatment with these organic compound and inorganic compound; organic-inorganic modified silica subjected to a surface treatment with a organic-inorganic hybrid material, such as a silane coupling agent, and the like.

The silica particles may be a mixture of two or more kinds thereof.

The mass concentration of the silica in the silica particles is preferably from 70 to 100% by mass, more preferably from 85 to 100% by mass, and further preferably from 90 to 100% by mass, based on the total amount (100% by mass) of the silica particles.

The volume average secondary particle diameter of the silica particles used in one embodiment of the present invention is preferably from 0.5 to 10 m, more preferably from 1 to 8 μm, and further preferably from 1.5 to 5 μm, from the standpoint of enhancing the air escape property and the blister resistance of the pressure sensitive adhesive sheet, and the standpoint of facilitating the formation of the one or more concave portions of irregular shapes on the surface (α) of the resin layer formed.

In the present invention, the value of the volume average secondary particle diameter of the silica particles is a value obtained by measuring the particle size distribution with Multisizer III or the like by the Coulter Counter method.

Examples of the metal oxide particles include particles formed of a metal oxide selected from titanium oxide, alumina, boehmite, chromium oxide, nickel oxide, copper oxide, titanium oxide, zirconium oxide, indium oxide, zinc oxide, and a complex oxide of these compounds, and also include sol particles formed of these metal oxides.

Examples of the smectite include montmorillonite, beidellite, hectorite, saponite, stevensite, nontronite, and sauconite.

The mass retention rate of the resin layer of the pressure sensitive adhesive sheet according to one embodiment of the present invention after heating the resin layer at 800° C. for 30 minutes is preferably 3 to 90% by mass, more preferably from 5 to 80% by mass, further preferably from 7 to 70% by mass, and still further preferably from 9 to 60% by mass.

The mass retention rate can be assumed to be the content (% by mass) of the fine particles contained in the resin layer.

When the mass retention rate is 3% by mass or more, the pressure sensitive adhesive sheet may be excellent in air escape property and blister resistance. Furthermore, the formation of the plural concave portions satisfying the aforementioned requirements (I) to (III) on the surface ($\alpha$) of the resin layer formed can be facilitated in the production of the pressure sensitive adhesive sheet of the present invention. When the mass retention rate is 90% by mass or less, the resin layer may have a high film strength, and the pressure sensitive adhesive sheet may be excellent in water resistance and chemical resistance.

Method for Producing Pressure Sensitive Adhesive Sheet

The method for producing the pressure sensitive adhesive sheet of the present invention will be described.

The method for producing the pressure sensitive adhesive sheet of the present invention is not particularly limited, and a method containing the following steps (1) and (2) is preferred from the standpoint of the productivity, and the standpoint of facilitating the formation of the irregular concave portions through self-formation of the resin layer on the surface ($\alpha$) of the resin layer formed.

Step (1): a step of forming a coating film (x') formed by a composition (x) containing the resin as a main component, and a coating film (y') formed by a composition (y) containing 15% by mass or more of the fine particles Step (2): a step of drying the coating film (x') and the coating film (y') formed in the step (1) simultaneously Step (1)

The step (1) is a step of forming a coating film (x') formed by a composition (x) containing the resin as a main component, and a coating film (y') formed by a composition (y) containing 15% by mass or more of the fine particles.

The composition (x) is a formation material of the resin part (X), preferably contains the resin and the crosslinking agent, and may further contain the aforementioned general additive.

The composition (y) is a formation material of the particle part (Y), and may further contain a resin, a crosslinking agent, and the aforementioned general additive. The composition (y) containing the components including the resin and the like may also be a formation material of the resin part (X).

Composition (x)

Examples of the resin contained in the composition (x) include the resin constituting the resin part (X), in which the pressure sensitive adhesive resin having a functional group is preferred, the acrylic resin (A) having a functional group is more preferred, and the acrylic copolymer (A1) is preferred.

The content of the resin in the composition (x) is generally 40% by mass or more, preferably 50% by mass or more, more preferably 65% by mass or more, further preferably 75% by mass or more, still further preferably 85% by mass or more, and still more further preferably 90% by mass or more, and is preferably 100% by mass or less, and more preferably 95% by mass or less, based on the total amount (100% by mass (except for a diluting solvent)) of the composition (x).

Examples of the crosslinking agent contained in the composition (x) include the crosslinking agent contained in the resin part (X), and the composition (x) preferably contains one or more selected from a metal chelate crosslinking agent and an epoxy crosslinking agent, and more preferably contains a metal chelate crosslinking agent.

The resin part (X) preferably contains both a metal chelate crosslinking agent and an epoxy crosslinking agent from the standpoint of improving the shape retention property of the plural concave portions on the surface ($\alpha$) of the resin layer formed.

In the case where the composition (x) contains both a metal chelate crosslinking agent and an epoxy crosslinking agent, the content ratio of the metal chelate crosslinking agent and the epoxy crosslinking agent in the composition (x) ((metal chelate crosslinking agent)/(epoxy crosslinking agent)) is preferably from 10/90 to 99.5/0.5, more preferably from 50/50 to 99.0/1.0, further preferably from 65/35 to 98.5/1.5, and still further preferably from 75/25 to 98.0/2.0, in terms of part by mass.

The content of the crosslinking agent is preferably from 0.01 to 15 parts by mass, more preferably from 0.1 to 10 parts by mass, and further preferably from 0.3 to 7.0 parts by mass, per 100 parts by mass of the resin contained in the composition (x).

The composition (x) is preferably an acrylic pressure sensitive adhesive containing the acrylic resin (A) having a functional group and the crosslinking agent (B), and more preferably an acrylic pressure sensitive adhesive containing the acrylic copolymer (A1) and the crosslinking agent (B).

The details of the acrylic pressure sensitive adhesive are as described above.

The composition (x) may contain the fine particles, provided that the content of the fine particles is less than 15% by mass and is smaller than the content of the resin contained in the composition (x).

The specific content of the fine particles is less than 15% by mass, preferably from 0 to 13% by mass, more preferably from 0 to 10% by mass, further preferably from 0 to 5% by mass, and still further preferably 0% by mass, based on the total content (100% by mass (except for a diluting solvent)) of the composition (x).

Composition (y)

The composition (y) is a formation material of the particle part (Y) and contains at least 15% by mass or more of the fine particles, and from the standpoint of the dispersibility of the fine particles, the composition (y) preferably contains, in addition to the fine particles, the aforementioned resin, and more preferably contains the resin and the crosslinking agent. The composition (y) may contain the general additive.

The resin, the crosslinking agent, and the general additive become a formation material of the resin part (X).

Examples of the fine particles contained in the composition (y) include those described above, and at least one selected from silica particles, metal oxide particles, and smectite are preferred from the standpoint of forming a void part (Z) in the resin layer and providing the pressure sensitive adhesive sheet that is enhanced in blister resistance.

The content of the fine particles in the composition (y) is 15% by mass or more, preferably from 20 to 100% by mass, more preferably 25 to 90% by mass, further preferably from 30 to 85% by mass, and still further preferably from 35 to 80% by mass, based on the total amount (100% by mass (except for a diluting solvent)) of the composition (y), from the standpoint of facilitating the formation of the one or more concave portions of irregular shapes formed through self-formation of the resin layer on the surface ($\alpha$) of the resin layer.

Examples of the resin contained in the composition (y) include the same ones for the resin contained in the composition (x), and the composition (y) preferably contains the same resin as in the composition (x). The resin may be used solely or as a combination of two or more kinds thereof.

The more specific resin contained in the composition (y) is preferably a resin having a functional group, more preferably the acrylic resin (A) having a functional group, and further preferably the acrylic copolymer (A1).

The content of the resin in the composition (y) is generally from 1 to 85% by mass, preferably from 5 to 80% by mass, more preferably from 10 to 75% by mass, further preferably from 20 to 70% by mass, and still further preferably from 25 to 65% by mass, based on the total amount (100% by mass (except for a diluting solvent)) of the composition (y).

Examples of the crosslinking agent contained in the composition (y) include the crosslinking agent contained in the resin part (X), and the composition (y) preferably contains one or more selected from a metal chelate crosslinking agent and an epoxy crosslinking agent, and more preferably contains a metal chelate crosslinking agent. Furthermore, the composition also preferably contains both a metal chelate crosslinking agent and an epoxy crosslinking agent.

In the case where the composition (y) contains both a metal chelate crosslinking agent and an epoxy crosslinking agent, the preferred range of the content ratio of the metal chelate crosslinking agent and the epoxy crosslinking agent in terms of part by mass is the same as the composition (x).

The content of the crosslinking agent is preferably from 0.01 to 15% by mass, more preferably from 0.1 to 10 parts by mass, and further preferably from 0.3 to 7.0 parts by mass, per 100 parts by mass of the resin contained in the composition (y).

Method of Forming Coating Films (x') and (y')

In the formation of the coating film, from the standpoint of facilitating the formation of the coating film, the compositions (x) and (y) each are preferably mixed with a solvent to form a solution of the composition.

Examples of the solvent include water and an organic solvent.

Examples of the organic solvent include toluene, ethyl acetate, butyl acetate, methyl ethyl ketone, methyl isobutyl ketone, methanol, ethanol, isopropyl alcohol, t-butanol, s-butanol, acetylacetone, cyclohexanone, n-hexane, and cyclohexane. The solvent may be used solely or as a combination of two or more kinds thereof.

The order of laminating the coating films (x') and (y') formed in this step is not particularly limited, and the coating film are preferably formed in such a manner that the coating film (x') is laminated on the coating film (y').

The method for forming the coating films (x') and (y') may be a method of forming the coating film (y') and then forming successively the coating film (x') on the coating film (y'), and may be a method of forming the coating film (y') and the coating film (x') by simultaneous coating with a multilayer coater from the standpoint of the productivity.

Examples of the coater used in the successive formation thereof include a spin coater, a spray coater, a bar coater, a knife coater, a roll coater, a knife roll coater, a blade coater, a gravure coater, a curtain coater, and a die coater.

Examples of the coater used in the simultaneous coating with a multilayer coater include a curtain coater and a die coater, and among these, a die coater is preferred from the standpoint of the operationality.

In the step (1), after the formation of at least one of the coating film (x') and the coating film (y') and before transferring to the step (2), a preliminary drying treatment may be performed to such an extent that the curing reaction of the coating film does not proceed.

The drying temperature of the preliminary drying treatment in the step (1) may be generally appropriately determined to a temperature range where the curing of the coating film does not proceed, and is preferably less than the drying temperature in the step (2). The specific drying temperature shown by the determination of "less than the drying temperature in the step (2)" is preferably from 10 to 45° C., more preferably from 10 to 34° C., and further preferably from 15 to 30° C.

Step (2)

The step (2) is a step of drying the coating film (x') and the coating film (y') formed in the step (1) simultaneously.

By simultaneously drying the coating film (x') and the coating film (y') in this step, the resin layer containing the resin part (X) and the particle part (Y) is formed, and the plural concave portions are formed on the surface ($\alpha$) of the resin layer.

The drying temperature in this step is preferably from 35 to 200° C., more preferably from 60 to 180° C., further preferably from 70 to 160° C., and still further preferably from 80 to 140° C., from the standpoint of facilitating the formation of the one or more concave portions of irregular shapes formed through self-formation of the resin layer on the surface ($\alpha$) of the resin layer.

When the drying temperature is 35° C. or more, the pressure sensitive adhesive sheet that has good air escape property can be obtained. When the drying temperature is 200° C. or less, a problem of shrinkage of the substrate or the release material of the pressure sensitive adhesive sheet can be avoided.

When the drying temperature is lower, there is a tendency that the height difference of the one or more concave portions formed is larger, but the number of the concave portions formed is decreased.

A void part (Z) may be formed around the particle part (Y) of the resin layer formed in this step.

The void part (Z) can be easily formed by using one or more selected from silica particles, metal oxide particles, and smectite, as the fine particles contained in the composition (y).

In the case of producing the pressure sensitive adhesive sheet having the resin layer having formed therein the multilayer structure a layer (X$\beta$) mainly containing the resin part (X), a layer (Y1) containing 15% by mass or more of the particle part (Y), and a layer (X$\alpha$) mainly containing the resin part (X), laminated in this order, as in the pressure sensitive adhesive sheets 1a to 2b in FIG. 1, the production methods according to the first and second embodiments shown below are preferred.

In the description of the production methods of the first and second embodiments, a "composition (x$\beta$) or (x$\alpha$) containing a resin as a main component" is the same as the aforementioned composition (x), and the details of the components contained in the composition (x$\beta$) or (x$\alpha$) (e.g., the kinds of the components, the preferred components, and the contents of the components) are also the same. The "composition (y) containing 15% by mass or more of the fine particles" is as described above.

Production Method of First Embodiment

The production method of the first embodiment contains at least the following steps (1A) and (2A).

Step (1A): a step of forming a coating film (x$\beta$') formed by a composition (x$\beta$) containing the resin as a main component, a coating film (y') containing a composition (y) containing 15% by mass or more of the fine particles, and a coating film (xα') formed by a composition (xα) containing the resin as a main component, by laminating in this order on a substrate or a release material Step (2A): a step of drying the coating film (xβ'), the coating film (y'), and the coating film (xα') formed in the step (1A), simultaneously In the step (1A), the composition (xβ), the composition (y), and the composition (xα) each are also preferably mixed with a solvent to form a solution of the composition, which is then coated.

The method for forming the coating film (xβ'), the coating film (y'), and the coating film (xα') may be a method of forming the coating film (xβ') on the substrate or the release material, then forming the coating film (y') on the coating film (xβ'), and further forming the coating film (xα') on the coating film (y'), successively with the aforementioned coater, or may be a method of forming the coating film (xβ'), the coating film (y'), and the coating film (xα') by simultaneous coating with the aforementioned multilayer coater.

In the step (1A), after the formation of at least one of the coating film (xβ'), the coating film (y'), and the coating film (xα') and before transferring to the step (2A), a preliminary drying treatment may be performed to such an extent that the curing reaction of the coating film does not proceed.

For example, after forming each of the coating film (xβ'), the coating film (y'), and the coating film (xα'), the preliminary drying treatment may be performed in each time, or after forming the coating film (xβ') and the coating film (y'), the coating films may be subjected to the preliminary drying treatment, followed by forming the coating film (xα').

The drying temperature of the preliminary drying treatment in the step (1A) may be generally appropriately determined to a temperature range where the curing of the coating film formed does not proceed, and is preferably less than the drying temperature in the step (2A). The specific drying temperature shown by the determination of "less than the drying temperature in the step (2A)" is preferably from 10 to 45° C., more preferably from 10 to 34° C., and further preferably from 15 to 30° C.

The step (2A) is a step of drying the coating film (xβ'), the coating film (y'), and the coating film (xα') formed in the step (1A), simultaneously, and the preferred range of the drying temperature in this step is the same as in the step (2). According to this step, the resin layer containing the resin part (X) and the particle part (Y) is formed.

Production Method of Second Embodiment

The production method of the second embodiment contains at least the following steps (1B) and (2B).

Step (1B): a step of forming a coating film (y') formed by a composition (y) containing 15% by mass or more of the fine particles and a coating film (xα') containing a composition (xα) formed by the resin as a main component, by laminating in this order on a layer (Xβ) containing mainly the resin part (X) provided on a substrate or a release material Step (2B): a step of drying the coating film (y') and the coating film (xα') formed in the step (1B) simultaneously In the step (1B), the "layer (Xβ) containing mainly the resin part (X)" may be formed by drying the coating film (xβ') containing the composition (xβ) containing the resin as a main component.

The layer (Xβ) is formed with the composition (xβ), and thus the layer (Xβ) may contain the crosslinking agent, the general additive, and the like, in addition to the resin. The content of the resin part (X) in the layer (Xβ) is as described above.

In the method of forming the layer (Xβ), the coating film (xβ') containing the composition (xβ) containing the resin as a main component may be formed on the substrate or the release material, and then the coating film (xβ') may be dried to form the layer (Xβ).

The drying temperature at this time is not particularly limited, and is preferably from 35 to 200° C., more preferably from 60 to 180° C., further preferably from 70 to 160° C., and still further preferably from 80 to 140° C.

This embodiment is different from the first embodiment in the point that the coating film (y') and the coating film (xα') are formed in this order on the layer (Xβ) obtained after drying, but not on the coating film (xβ').

In the step (1B), the composition (y) and the composition (xα) each are also preferably mixed with a solvent to form a solution of the composition, which is then coated.

The method for forming the coating film (y') and the coating film (xα') may be a method of forming the coating film (y') on the layer (Xβ), and further forming the coating film (xα') on the coating film (y'), successively with the aforementioned coater, or may be a method of forming the coating film (y') and the coating film (xα') by simultaneous coating with the aforementioned multilayer coater.

In the step (1B), after the formation of the coating film (y') or after the formation of the coating film (y') and the coating film (xα') and before transferring to the step (2B), a preliminary drying treatment may be performed to such an extent that the curing reaction of the coating film does not proceed.

The drying temperature of the preliminary drying treatment in the step (1B) may be generally appropriately determined to a temperature range where the curing of the coating film formed does not proceed, and is preferably less than the drying temperature in the step (2B). The specific drying temperature shown by the determination of "less than the drying temperature in the step (2B)" is preferably from 10 to 45° C., more preferably from 10 to 34° C., and further preferably from 15 to 30° C.

The step (2B) is a step of drying the coating film (y') and the coating film (xα') formed in the step (1B) simultaneously, and the preferred range of the drying temperature in this step is the same as in the step (2). According to this step, the resin layer containing the resin part (X) and the particle part (Y) is formed.

Viscoelastic Layer

The present invention also provides a viscoelastic layer containing a resin, a least one surface thereof having concave portions, the concave portions having an irregular shape.

The viscoelastic layer according to one embodiment of the present invention preferably contains a resin part (X) containing a resin as a main component, and a particle part (Y) consisting of fine particles.

The kind and the content of the resin, the kind and the content of the fine particles, and the kinds and the contents of other components constituting the viscoelastic layer, and the constitutional requirements relating to the viscoelastic layer (e.g., the layer structure, the requirements relating to the one or more concave portions, the thickness, the formation material, the production method, and the like) are the same as the constitutional requirements described above for the resin layer.

However, the surface of the viscoelastic layer may not necessarily have pressure sensitive adhesiveness. Accordingly, the resin used for constituting the viscoelastic layer may be only a non-pressure sensitive adhesive resin.

EXAMPLES

The present invention will be described more specifically with reference to the following examples, but the present invention is not limited to the following examples. The property values in the following examples and production examples are values measured by the following methods.

Mass Average Molecular Weight of Resin (Mw)

The measurement was performed by using a gel permeation chromatography instrument ("HLC-8020, a product name, produced by Tosoh Corporation) under the following conditions, and a value measured as the standard polystyrene conversion was used.

Measurement Condition

Column: "TSK guard column HXL-L", "TSK gel G2500HXL", "TSK gel G2000HXL", and "TSK gel G1000HXL" (all produced by Tosoh Corporation), connected in series Column temperature: 40° C.

Developing solvent: tetrahydrofuran

Flow rate: 1.0 mL/min

Measurement of Volume Average Secondary Particle Diameter of Silica Particles

The volume average secondary particle diameter of the silica particles was obtained by measuring the particle size distribution with Multisizer III (produced by Beckman Coulter Inc.) by the Coulter Counter method.

Measurement of Thickness of Resin Layer

The thickness of the resin layer was measured by observing the cross section of the resin layer of the target pressure sensitive adhesive sheet with a scanning electron microscope ("S-4700", a product name, produced by Hitachi, Ltd.).

Production Examples x-1 to x-6

Preparation of Solutions (x-1) to (x-6) of Resin Composition

To 100 parts by mass of the solution of an acrylic resin with the kind and the solid content shown in Table 1, a crosslinking agent and a diluting solvent with the kinds and the mixed amounts shown in Table 1 were added, so as to prepare solutions (x-1) to (x-6) of a resin composition having the solid contents shown in Table 1.

The details of the components shown in Table 1 used for the preparation of the solutions (x-1) to (x-6) of a resin composition are as follows.

Solution of Acrylic Resin

Solution (i): a mixed solution of toluene and ethyl acetate containing an acrylic resin (x-i) (an acrylic copolymer having structural units derived from butyl acrylate (BA) and acrylic acid (AA), BA/AA=90/10 (% by mass), Mw: 470,000) having a solid concentration of 33.6% by mass Solution (ii): a mixed solution of toluene and ethyl acetate containing an acrylic resin (x-ii) (an acrylic copolymer having structural units derived from butyl acrylate (BA), 2-ethylhexyl acrylate (2EHA), vinyl acetate (VAc), and acrylic acid (AA), BA/2EHA/VAc/AA=46/37/10/7 (% by mass), Mw: 370,000) having a solid concentration of 43.0% by mass Crosslinking Agent Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Isocyanate crosslinking agent: "Coronate L", a product name, produced by Tosoh Corporation, solid concentration: 75% by mass Aziridine crosslinking agent: "BXX5134", a product name, produced by Toyochem Co., Ltd., solid concentration: 5% by mass Diluting Solvent IPA: isopropyl alcohol (IPA)

AcOEt: ethyl acetate

TABLE 1

| | Solution of resin composition | Solution of acrylic resin | | Mixed amount (part by mass) | Mixed amount of solid content (part by mass) | Aluminum chelate crosslinking agent | | Solid content per 100 parts by mass of acrylic resin (part by mass) | Epoxy crosslinking agent Mixed amount (part by mass) |
|---|---|---|---|---|---|---|---|---|---|
| | | Kind | Kind of resin | | | Mixed amount (part by mass) | Mixed amount of solid content (part by mass) | | |
| Production Example x-1 | (x-1) | solution (i) | acrylic resin (x-i) (BA/AA = 90/10 (wt %), Mw: 470,000 | 100 | 33.6 | 5 | 0.25 | 0.74 | — |
| Production Example x-2 | (x-2) | solution (i) | acrylic resin (x-i) (BA/AA = 90/10 (wt %), Mw: 470,000 | 100 | 33.6 | — | — | — | — |
| Production Example x-3 | (x-3) | solution (ii) | Acrylic resin (x-ii) (BA/2EHA/VAc/AA = 46/37/10/7 (wt %), Mw: 370,000 | 100 | 43.0 | 4.5 | 0.22 | 0.52 | 0.3 |
| Production Example x-4 | (x-4) | solution (i) | acrylic resin (x-i) (BA/AA = 90/10 (wt %), Mw: 470,000 | 100 | 33.6 | — | — | — | 0.6 |
| Production Example x-5 | (x-5) | solution (i) | acrylic resin (x-i) (BA/AA = 90/10 (wt %), Mw: 470,000 | 100 | 33.6 | — | — | — | — |
| Production Example x-6 | (x-6) | solution (i) | acrylic resin (x-i) (BA/AA = 90/10 (wt %), Mw: 470,000 | 100 | 33.6 | — | — | — | — |

TABLE 1-continued

| | Epoxy crosslinking agent | | Isocyanate crosslinking agent | | | Aziridine crosslinking agent | | | | Solid concentration of solution of resin composition (% by mass) |
|---|---|---|---|---|---|---|---|---|---|---|
| | Mixed amount of solid content (part by mass) | Solid content per 100 parts by mass of acrylic resin (part by mass) | Mixed amount (part by mass) | Mixed amount of solid content (part by mass) | Solid content per 100 parts by mass of acrylic resin (part by mass) | Mixed amount (part by mass) | Mixed amount of solid content (part by mass) | Solid content per 100 parts by mass of acrylic resin (part by mass) | Diluting solvent Kind | |
| Production Example x-1 | — | — | — | — | — | — | — | — | IPA | 28 |
| Production Example x-2 | — | — | — | — | — | — | — | — | IPA | 27 |
| Production Example x-3 | 0.015 | 0.035 | — | — | — | — | — | — | IPA | 34.4 |
| Production Example x-4 | 0.030 | 0.089 | — | — | — | — | — | — | IPA | 24 |
| Production Example x-5 | — | — | 1.5 | 0.56 | 1.674 | — | — | — | AcOEt | 28 |
| Production Example x-6 | — | — | — | — | — | 1.0 | 0.050 | 0.149 | AcOEt | 28 |

Production Example y-0

Preparation of Fine Particle Dispersion Liquid (y-0)

To 100 parts by mass (solid content: 33.6 parts by mass) of the solution (i) containing the acrylic resin (x-i) (a mixed solution of toluene and ethyl acetate containing an acrylic copolymer having structural units derived from butyl acrylate (BA) and acrylic acid (AA) (BA/AA=90/10 (% by mass), Mw: 470,000) having a solid concentration of 33.6% by mass), 50.4 parts by mass (solid content: 50.4 parts by mass) of silica particles as fine particles ("Nipsil E-200A", a product name, produced by Tosoh Silica Corporation, volume average secondary particle diameter: 3 μm) and toluene were added, and the fine particles were dispersed, so as to prepare a fine particle dispersion liquid (y-0) having a solid concentration of 30% by mass containing the acrylic resin and the silica particles.

Production Examples y-1 to y-8

Preparation of Coating Liquids (y-1) to (y-8) for Forming Coating Film (y')

To the mixed amount shown in Table 2 of the fine particle dispersion liquid (y-0) produced in Production Example y-0, the kinds and the mixed amounts shown in Table 2 of the solution of an acrylic resin, the crosslinking agent, and the diluting solvent were added, so as to prepare coating liquids (y-1) to (y-8) for forming a coating film (y') having the solid concentrations shown in Table 2.

The details of the components shown in Table 2 used for the preparation of the coating liquids (y-1) to (y-8) for forming a coating film (y') are as follows.

Solution of Acrylic Resin

Solution (i): acrylic resin (x-i) (the details thereof are described above)

Crosslinking Agent

Aluminum chelate crosslinking agent: "M-5A", a product name, produced by Soken Chemical & Engineering Co., Ltd., solid concentration: 4.95% by mass Epoxy crosslinking agent: a solution of an epoxy crosslinking agent obtained by diluting "TETRAD-C" (a product name, produced by Mitsubishi Gas Chemical Co., Inc.) with toluene to make a solid concentration of 5% by mass Diluting Solvent IPA: isopropyl alcohol (IPA)

IPA/CHN: mixed solvent containing isopropyl alcohol (IPA) and cyclohexanone (CHN) (IPA/CHN=60/40 (mass ratio))

TABLE 2

| | Coating liquid for forming coated layer (y') | Fine particle dispersion liquid (y-0) produced in Production Example y-0 (solid concentration: 30 wt %) | | | Solution of acrylic resin | | | | Aluminum chelate crosslinking agent (M-5A, solid concentration: 4.95 wt %) |
|---|---|---|---|---|---|---|---|---|---|
| | | Mixed amount (part by mass) | Mixed amount of solid content (part by mass) | Content of fine particles (*) (part by mass) | Kind | Kind or resin | Mixed amount (part by mass) | Mixed amount of solid content (part by mass) | Mixed amount (part by mass) |
| Production Example y-1 | (y-1) | 69.7 | 20.9 | 12.5 | solution (i) | acrylic resin (x-i) (BA/AA = 90/10 (wt %), Mw: 470,000 | 30.3 | 10.2 | 5.52 |
| Production Example y-2 | (y-2) | 61.6 | 18.5 | 11.1 | solution (i) | acrylic resin (x-i) (BA/AA = 90/10 (wt %), Mw: 470,000 | 38.4 | 12.9 | 6.04 |
| Production Example y-3 | (y-3) | 77.6 | 23.3 | 14.0 | solution (i) | acrylic resin (x-i) (BA/AA = 90/10 (wt %), Mw: 470,000 | 22.4 | 7.5 | 5.01 |

TABLE 2-continued

| | | | | | | | | | |
|---|---|---|---|---|---|---|---|---|---|
| Production Example y-4 | (y-4) | 85.4 | 25.6 | 15.4 | solution (i) | acrylic resin (x-i) (BA/AA = 90/10 (wt %), Mw: 470,000 | 14.6 | 4.9 | 4.51 |
| Production Example y-5 | (y-5) | 71.0 | 21.3 | 12.8 | solution (i) | acrylic resin (x-i) (BA/AA = 90/10 (wt %), Mw: 470,000 | 29.0 | 9.7 | 5.44 |
| Production Example y-6 | (y-6) | 69.7 | 20.9 | 12.5 | solution (i) | acrylic resin (x-i) (BA/AA = 90/10 (wt %), Mw: 470,000 | 30.3 | 10.2 | — |
| Production Example y-7 | (y-7) | 71.0 | 21.3 | 12.8 | solution (i) | acrylic resin (x-i) (BA/AA = 90/10 (wt %), Mw: 470,000 | 29.0 | 9.7 | — |
| Production Example y-8 | (y-8) | 71.0 | 21.3 | 12.8 | solution (i) | acrylic resin (x-i) (BA/AA = 90/10 (wt %), Mw: 470,000 | 29.0 | 9.7 | 2.72 |

| | Aluminum chelate crosslinking agent (M-5A, solid concentration: 4.95 wt %) | | Epoxy crosslinking agent (TETRAD-C, solid concentration: 5 wt %) | | | | |
|---|---|---|---|---|---|---|---|
| | Mixed amount of solid content (part by mass) | Solid content per 100 parts by mass of acrylic resin (part by mass) | Mixed amount of solid content (part by mass) | Solid content per 100 parts by mass of acrylic resin (part by mass) | Diluting solvent Kind | Solid concentration of coating liquid (% by mass) | Concentration of fine particles in solid content of coating liquid (**) (% by mass) |
| Production Example y-1 | 0.27 | 1.47 | — | — | — | IPA | 27 | 40 |
| Production Example y-2 | 0.30 | 1.47 | — | — | — | IPA | 27 | 35 |
| Production Example y-3 | 0.25 | 1.47 | — | — | — | IPA | 27 | 45 |
| Production Example y-4 | 0.22 | 1.47 | — | — | — | IPA | 27 | 50 |
| Production Example y-5 | 0.27 | 1.47 | — | — | — | IPA/CHN | 26 | 41 |
| Production Example y-6 | — | — | — | — | — | IPA | 27 | 40 |
| Production Example y-7 | — | — | 0.66 | 0.033 | 0.18 | IPA | 26 | 41 |
| Production Example y-8 | 0.13 | 0.74 | 0.33 | 0.017 | 0.09 | IPA | 26 | 41 |

(*): value calculated from (solid mixed amount) × 50.4/(50.4 + 33.6)
(**): value calculated from (content of fine particles)/((solid mixed amount in fine particle dispersion liquid (y-0)) + (solid mixed amount of acrylic resin) + (solid mixed amount of aluminum chelate crosslinking agent) + (solid mixed amount of epoxy crosslinking agent)) × 100

Examples 1 to 8

(1) Formation of Coating Film

A polyethylene terephthalate (PET) film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to the thickness shown in Table 3 as the thickness of the coating film after coating (i.e., the thickness of the coating film in a non-dried state), so as to form a coating film (xβ').

Subsequently, on the coating film (xβ') thus formed, one of the coating liquids (y-1) to (y-4) for forming a coating film (y') of the kinds shown in Table 3 was coated with an applicator to the thickness shown in Table 3 as the total thickness after coating both the two layers, i.e., the coating film (xβ') and a coating film (y') (i.e., the total thickness of the two layers in a non-dried state), so as to form a coating film (y').

Then, on the coating film (y') thus formed, the solution (x-1) of a resin composition prepared in Production Example x-1 was coated with an applicator to the thickness shown in Table 3 as the total thickness after coating all the three layers, i.e., the coating film (xβ'), the coating film (y'), and a coating film (xα') (i.e., the total thickness of the three layers in a non-dried state), so as to form a coating film (xα').

(2) Drying Treatment

The three layers of the coating film (xβ'), the coating film (y'), and the coating film (xα') were simultaneously dried at a drying temperature of 100° C. for 2 minutes, thereby producing a pressure sensitive adhesive sheet having a resin layer containing a resin part (X) and a particle part (Y) having the thickness shown in Table 3.

Example 9

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-2) of a resin composition prepared in Production Example x-2 was coated with a knife coater to a thickness of 25 μm as the thickness of the coating film after coating (i.e., the thickness of the coating film in a non-dried state), so as to form a coating film (xβ'), which was then dried at a drying temperature of 100° C. for 2 minutes, so as to form a layer (Xβ) containing a resin part (X).

Lamination was performed in such a manner that the surface of the layer (Xβ) thus formed was attached to a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated with a multilayer die coater (width: 500 mm), so as to form a coating film (y') and a coating film (xα') simultaneously in this order on the layer (Xβ). The coating films were formed to a thickness of 55 μm for the coating film (y') and a thickness of 65 μm for the coating film (xα') through the setting of the multilayer die coater.

Then, the two layers of the coating film (y') and the coating film (xα') were simultaneously dried at a drying temperature of 100° C. for 2 minutes, thereby producing a pressure sensitive adhesive sheet having a resin layer containing a resin part (X) and a particle part (Y) having the thickness shown in Table 3.

Comparative Example 1

A pressure sensitive adhesive sheet having a resin layer containing only a resin part (X) having a thickness of 25 μm was produced in the same manner as in Example 1, except that the coating film (y') and the coating film (xα') in Example 1 were not formed, but on the aluminum vapor deposition layer of the PET film used as the substrate, the solution (x-1) of a resin composition prepared in Production Example x-1 was coated with a knife coater to a thickness of 25 μm after drying to form a coating film (xβ').

Comparative Example 2

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with an applicator to form a coating film (xβ'), which was then dried at 100° C. for 2 minutes, so as to form a layer (Xβ) containing a resin part (X) having a thickness of 5 μm.

Separately from the above, on a release agent layer of a release film ("SP-PET381031", a product name, produced by Lintec Corporation, a PET film having a silicone release agent layer provided on one surface thereof, thickness: 38 μm), the coating liquid (y-1) for forming a coating film (y') prepared in Production Example y-1 was coated with an applicator to form a coated layer (y'), which was then dried at 100° C. for 2 minutes, so as to form a layer (Y1) containing a resin part (X) and a particle part (Y) having a thickness of 15 μm.

Further separately from the above, on a release agent layer of a release film of the same kind as above, the solution (x-1) of a resin composition prepared in Production Example x-1 was coated with an applicator to form a coating film (xα'), which was then dried at 100° C. for 2 minutes, so as to form a layer (Xα) containing a resin part (X) having a thickness of 5 μm.

Then, lamination was performed in such a manner that the surface of the layer (Xβ) formed on the PET film as the substrate was attached to the exposed surface of the layer (Y1) thus formed. Furthermore, lamination was performed in such a manner that the surface of the layer (Y1) having been exposed by removing the release film on the layer (Y1) was attached to the exposed surface of the layer (Xα) thus formed.

According to the procedures, a pressure sensitive adhesive sheet having a resin layer containing a resin part (X) and a particle part (Y) having a thickness of 25 μm, containing the substrate having laminated in this order thereon the layer (Xβ), the layer (Y1), and the layer (Xα) was produced.

Examples 10 to 16

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, one of the solutions (x-1) to (x-6) of a resin composition prepared in Production Examples x-1 to x-6 and one of the coating liquids (y-1) to (y-8) for forming a coating film (y') prepared in Production Examples y-1 to y-8 were simultaneously coated with a multilayer die coater (width: 250 mm) at the flow rate and the coating speed shown in Table 4, so as to form a coating film (xβ'), a coating film (y'), and a coating film (xα') simultaneously in this order from the side of the substrate.

The kind of the resin composition and the kind of the coating liquid for forming a coated layer (y') used as formation materials of the coating films are shown in Table 4.

The three layers of the coating film (xβ'), the coating film (y'), and the coating film (xα') were simultaneously dried at a drying temperature of 100° C. for 2 minutes, thereby producing a pressure sensitive adhesive sheet having a resin layer containing a resin part (X) and a particle part (Y) having the thickness shown in Table 4.

Example 17

On a release agent layer of a release film ("SP-PET381031", a product name, produced by Lintec Corporation, a PET film having a silicone release agent layer provided on one surface thereof, thickness: 38 μm) as a first release material, the solution (x-3) of a resin composition prepared in Production Example x-3, the coating liquid (y-5) for forming a coating film (y') prepared in Production Example y-5, and the solution (x-3) of a resin composition prepared in Production Example x-3 were simultaneously coated in this order with a multilayer die coater (width: 250 mm) at the flow rate and the coating speed shown in Table 4, so as to form a coating film (xβ'), a coating film (y'), and a coating film (xα') simultaneously in this order from the side of the release film.

Then, the three layers of the coating film (xβ'), the coating film (y'), and the coating film (xα') were simultaneously dried at a drying temperature of 100° C. for 2 minutes, so as to form a resin layer containing a resin part (X) and a particle part (Y) having the thickness shown in Table 4. Then, lamination was performed in such a manner that the surface (α) of the resin layer thus formed was attached to a surface of a release agent layer of a release film ("SP-PET386040", a product name, produced by Lintec Corporation) as a second release material, thereby producing a pressure sensitive adhesive sheet without a substrate.

Subsequently, after allowing to stand the pressure sensitive adhesive sheet without a substrate under an environment at 23° C. for one week, the first release material was removed, and lamination was performed in such a manner that the exposed surface (β) of the resin layer was attached to a surface of an aluminum vapor deposition layer of a PET film having an aluminum vapor deposition layer ("FNS MAT N50", a product name, produced by Lintec Corporation, thickness: 50 μm) as a substrate, thereby providing a pressure sensitive adhesive sheet with a substrate.

Example 18

A PET film having an aluminum vapor deposition layer on one surface thereof ("FNS MAT N50", a product name, produced by Lintec Corporation, thickness: 50 μm) was used as a substrate.

On the aluminum vapor deposition layer of the PET film, the solution (x-1) of a resin composition prepared in Production Example x-1 was coated with a knife coater to form a coating film (xβ'), which was then dried at 100° C. for 2 minutes, so as to form a layer (Xβ) containing a resin part (X) having a thickness of 8 μm. Lamination was performed in such a manner that the surface of the layer (Xβ) thus formed was attached to a surface of a release agent layer of a release film ("SP-PET381031", a product name, produced by Lintec Corporation, a PET film having a silicone release agent layer provided on one surface thereof, thickness: 38 μm), so as to produce once a laminated body having the layer (Xβ).

Subsequently, on the surface of the layer (Xβ) having been exposed by removing the release film of the laminated body, the coating liquid (y-1) for forming a coating film (y') prepared in Production Example y-1 and the solution (x-1) of a resin composition prepared in Production Example x-1 were simultaneously coated in this order with a multilayer die coater (width: 500 mm) at the flow rate and the coating speed shown in Table 4, so as to form a coating film (y') and a coating film (xα') simultaneously in this order from the side of the layer (Xβ).

Then, the two layers of the coating film (y') and the coating film (xα') were simultaneously dried at a drying temperature of 100° C. for 2 minutes, thereby producing a pressure sensitive adhesive sheet having a resin layer containing a resin part (X) and a particle part (Y) having the thickness shown in Table 4.

The resin layers of the pressure sensitive adhesive sheets produced in Examples and Comparative Examples were observed or measured for the determination of the presence or absence of the one or more concave portions on the surface (α), the determination as to whether or not the one or more concave portions have an irregular shape, the shape and the positions of the one or more concave portions on the surface (α), the shape of the attached surface, and the mass retention rate of the resin layer, in the following manner. The results are shown in Tables 3 and 4.

Presence or Absence of One or More Concave Portions of Irregular Shapes on Surface (α)

10 regions (R) each surrounded by a square having an edge length of 4 mm were arbitrarily selected on the surface (α) of the resin layer of the pressure sensitive adhesive sheets produced in Examples and Comparative Examples, the shapes of the one or more concave portions present in the respective regions (R) were observed visually or with a digital microscope ("Digital Microscope VHX-5000", product names, produced by Keyence Corporation, magnification: 50) from the side of the surface (α) in the plan view (in the perspective view depending on necessity), and the presence or absence of the one or more concave portions of irregular shapes was confirmed.

In the case where plural concave portions were confirmed in the selected 10 regions in the aforementioned observation, the number of the concave portion, the presence or absence of periodicity around the position where the concave portions are present (requirement (IV)), and the shape of the attached surface in the selected 10 regions were also confirmed.

Shapes of Concave Portions on Surface (α)

In the particular region defined in the following requirements (I) to (III) on the surface (α) of the resin layer of the pressure sensitive adhesive sheet, as to whether or not the one or more concave portions satisfying the following requirements (I) to (III) were formed were determined by observing with a scanning electron microscope ("S-4700", a product name, produced by Hitachi, Ltd., magnification for the requirement (II): 30).

In Tables 3 and 4, the case where the one or more concave portions satisfying the requirements are formed is shown by "A", and the case where the presence of the concave portion satisfying the requirements is not confirmed is shown by "F".

Requirement (I): In the region (P) surrounded by a square having an edge length of 5 mm arbitrarily selected on the surface (α), plural concave portions having a maximum height difference of 0.5 μm or more were present.

Requirement (II): The plural concave portions having a maximum height difference of 0.5 μm or more are present in the region (P) surrounded by a square having an edge length of 5 mm arbitrarily selected on the surface (α), and with respect to the total number (100%) of the plural concave portions, the number of the concave portions having shapes different from each other was 95% or more (in the case of the number being 100%, i.e., all the concave portions in the region (P) had shapes different from each other, "A+" is shown in the tables).

Requirement (III): In the region (Q) surrounded by a square having an edge length of 1 mm arbitrarily selected on the surface (α), one or more concave portions having a maximum height difference of 0.5 μm or more was present.

Among the values of the height differences of the plural concave portions measured on the evaluation of the requirement (I), the maximum value is described as "maximum value of height difference" in Tables 3 and 4.

Mass Retention Rate of Resin Layer of Pressure Sensitive Adhesive Sheet

For Examples and Comparative Examples except for Example 17, the resin layer was formed according to the method of the Examples and Comparative Examples on a surface of the release agent layer of a release film ("SP-PET381031", a product name, produced by Lintec Corporation, a PET film having a silicone release agent layer provided on one surface thereof, thickness: 38 μm) instead of the substrate, and then the release film was removed, so as to provide a sole resin layer.

For Example 17, the two release films were removed from the pressure sensitive adhesive sheet without a substrate obtained in the course of the production, so as to provide a sole resin layer.

The resin layer before heating was measured for the mass thereof, and then heated to 800° C. for 30 minutes in a muffle furnace ("KDF-P90", a product name, produced by Denken Co., Ltd.). The resin layer after heating was measured for the mass thereof, and the mass retention rate of the resin layer was calculated by the following expression.

mass retention rate of resin layer (%)=((mass of resin layer after heating)/(mass of resin layer before heating))×100

The pressure sensitive adhesive sheets produced in Examples and Comparative Examples were measured or evaluated for the "air escape property", the "blister resistance", and the "adhesive strength" according to the following methods. The results are shown in Tables 3 and 4.

Air Escape Property

The pressure sensitive adhesive sheet in a size of 50 mm in length and 50 mm in width was attached to a melamine-coated plate as an adherend in a manner forming air accumulation. The presence of absence of the air accumulation after press-attaching with a squeegee was observed, and the air escape property of the pressure sensitive adhesive sheets was evaluated based on the following standard.

A: The air accumulation disappeared, and excellent air escape property was obtained.

F: The air accumulation remained, and poor air escape property was obtained.

Blister Resistance

The pressure sensitive adhesive sheet in a size of 50 mm in length and 50 mm in width was attached to a polymethyl methacrylate plate having a size of 70 mm in length, 150 mm in width, and 2 mm in thickness ("Acrylite L001", produced by Mitsubishi Rayon Co., Ltd.), followed by press-attaching with a squeegee, so as to provide a test specimen.

The test specimen was allowed to stand at 23° C. for 12 hours, then allowed to stand in a hot air dryer at 80° C. for 1.5 hours, further allowed to stand in a hot air dryer at 90° C. for 1.5 hours, and then visually observed for the occurrence state of blister after the heat acceleration, and the blister resistance of the pressure sensitive adhesive sheets was evaluated based on the following standard.

A: Completely no blister was observed.

B: Blister was partially observed.

C: Blister was observed over the surface.

Adhesive Strength

The pressure sensitive adhesive sheets produced in Examples and Comparative Examples were cut into a size of 25 mm in length and 300 mm in width, and the surface ($\alpha$) of the resin layer of the pressure sensitive adhesive sheets was attached to a stainless steel plate (SUS304, polished with #360 polishing paper) under an environment of 23° C., 50% RH (relative humidity), followed by allowing to stand in the same environment for 24 hours. After standing, the adhesive strength of the pressure sensitive adhesive sheets was measured according to JIS Z0237:2000 by the 180° peeling method at a peeling speed of 300 mm/min.

TABLE 3

| | Thickness of coated layer (μm) | | | Coating film (y') | | | | Resin layer | | |
|---|---|---|---|---|---|---|---|---|---|---|
| | Coating film (xβ') | Coating film (xβ' + y') | Coating film (xβ' + y' + xα') | Coating film (xβ') Kind of solution | Kind of coating liquid | Concentration of fine particles in coated layer (y') (% by mass) | Coating film (xα') Kind of solution | Thickness (μm) | Number of concave portions | Shapes of one or more concave portions on surface (α) Shape of concave portion |
| Example 1 | 25.0 | 75.0 | 100 | (x-1) | (y-1) | 40 | (x-1) | 25.7 | plural | irregular |
| Example 2 | 12.5 | 75.0 | 100 | (x-1) | (y-1) | 40 | (x-1) | 25.1 | plural | irregular |
| Example 3 | 25.0 | 50.0 | 100 | (x-1) | (y-1) | 40 | (x-1) | 23.9 | plural | irregular |
| Example 4 | 25.0 | 200 | 250 | (x-1) | (y-1) | 40 | (x-1) | 43.1 | plural | irregular |
| Example 5 | 25.0 | 75.0 | 100 | (x-1) | (y-2) | 35 | (x-1) | 23.8 | plural | irregular |
| Example 6 | 25.0 | 75.0 | 100 | (x-1) | (y-3) | 45 | (x-1) | 30.1 | plural | irregular |
| Example 7 | 25.0 | 75.0 | 100 | (x-1) | (y-4) | 50 | (x-1) | 32.3 | plural | irregular |
| Example 8 | 25.0 | 200 | 250 | (x-1) | (y-2) | 35 | (x-1) | 41.0 | plural | irregular |
| Example 9 | 25.0 | 80 (*1) | 145 (*1) | (x-2) | (y-1) | 40 | (x-1) | 42.0 | plural | irregular |
| Comparative Example 1 | 25 (*2) | — | — | (x-1) | — | 0 | — | 25.0 | none | — |
| Comparative Example 2 | 5 (*2) | 20 (*2) | 25 (*2) | (x-1) | (y-1) | 40 | (x-1) | 25.0 | none | — |

| | Shapes of one or more concave portions on surface (α) | | | | | Mass retention rate of resin layer (% by mass) | Evaluation items of pressure sensitive adhesive sheet | | |
|---|---|---|---|---|---|---|---|---|---|
| | Requirement (I) | Requirement (II) | Requirement (III) | Requirement (IV) | Maximum value of height difference (μm) | | Air escape property | Blister resistance | Adhesive strength (N/25 mm) |
| Example 1 | A | A+ | A | absent | 15.7 | 16.9 | A | A | 8.6 |
| Example 2 | A | A+ | A | absent | 17.3 | 20.0 | A | A | 12.7 |
| Example 3 | A | A+ | A | absent | 7.6 | 9.5 | A | A | 11.7 |
| Example 4 | A | A+ | A | absent | 42.2 | 28.1 | A | A | 7.8 |
| Example 5 | A | A+ | A | absent | 6.6 | 15.0 | A | A | 9.4 |
| Example 6 | A | A+ | A | absent | 26.3 | 20.9 | A | A | 10.1 |

TABLE 3-continued

| | | | | | | | | | |
|---|---|---|---|---|---|---|---|---|---|
| Example 7 | A | A+ | A | absent | 30.8 | 23.1 | A | A | 10.8 |
| Example 8 | A | A+ | A | absent | 3.5 | 21.3 | A | A | 12.4 |
| Example 9 | A | A+ | A | absent | 18.5 | 15.1 | A | A | 10.2 |
| Comparative Example 1 | F | — (*3) | F | — | 0 | 0.0 | F | C | 18.0 |
| Comparative Example 2 | F | — (*3) | F | — | 0 | 17.0 | F | A | 15.0 |

(*1) thickness of the coated layer set by the multilayer die coater, but not a measured value
(*2) thickness of the coating film after drying
(*3) not evaluated due to no concave portion formed on the surface (α)

TABLE 4

| | Coating speed (m/min) | Flow rate of solution (coating liquid) (g/min) | | | Coating film (xβ') Kind of solution | Coating film (y') | | Coating film (xα') Kind of solution | Resin layer | | |
|---|---|---|---|---|---|---|---|---|---|---|---|
| | | Coating film (xβ') | Coating film (y') | Coating film (xα') | | Kind of coating liquid | Concentration of fine particles in coated layer (y') (% by mass) | | Thickness (μm) | Shapes of one or more concave portions on surface (α) | |
| | | | | | | | | | | Number of concave portions | Shape of concave portion |
| Example 10 | 3.0 | 27 | 27 | 27 | (x-1) | (y-1) | 40 | (x-1) | 30.0 | plural | irregular shape |
| Example 11 | 3.0 | 27 | 21 | 27 | (x-1) | (y-1) | 40 | (x-1) | 26.7 | plural | irregular shape |
| Example 12 | 3.0 | 27 | 9 | 27 | (x-1) | (y-1) | 40 | (x-1) | 23.3 | plural | irregular shape |
| Example 13 | 3.0 | 27 | 51 | 54 | (x-3) | (y-5) | 41 | (x-3) | 51.0 | plural | irregular shape |
| Example 14 | 3.0 | 27 | 27 | 27 | (x-4) | (y-6) | 40 | (x-4) | 29.6 | plural | irregular shape |
| Example 15 | 3.0 | 27 | 27 | 27 | (x-4) | (y-7) | 40 | (x-4) | 29.2 | plural | irregular shape |
| Example 16 | 3.0 | 27 | 27 | 27 | (x-5) | (y-8) | 40 | (x-6) | 29.5 | plural | irregular shape |
| Example 17 | 3.0 | 27 | 51 | 54 | (x-3) | (y-5) | 41 | (x-3) | 51.0 | plural | irregular shape |
| Example 18 | 5.0 | (8 μm) (*4) | 133 | 161 | (x-1) | (y-1) | 40 | (x-1) | 42.0 | plural | irregular shape |

| | Resin layer | | | | | | | |
|---|---|---|---|---|---|---|---|---|
| | Shapes of one or more concave portions on surface (α) | | | | Maximum value of height difference (μm) | Mass retention rate of resin layer (% by mass) | Evaluation items of pressure sensitive adhesive sheet | | |
| | Requirement (I) | Requirement (II) | Requirement (III) | Requirement (IV) | | | Air escape property | Blister resistance | Adhesive strength (N/25 mm) |
| Example 10 | A | A+ | A | absent | 20.3 | 8.6 | A | A | 8.8 |
| Example 11 | A | A+ | A | absent | 15.0 | 7.1 | A | A | 10.8 |
| Example 12 | A | A+ | A | absent | 10.6 | 5.8 | A | A | 13.3 |
| Example 13 | A | A+ | A | absent | 42.5 | 12.6 | A | A | 23.5 |
| Example 14 | A | A+ | A | absent | 19.5 | 8.4 | A | A | 10.3 |
| Example 15 | A | A+ | A | absent | 19.2 | 8.2 | A | A | 11.6 |
| Example 16 | A | A+ | A | absent | 17.7 | 8.0 | A | A | 9.8 |
| Example 17 | A | A+ | A | absent | 41.0 | 12.6 | A | A | 24.0 |
| Example 18 | A | A+ | A | absent | 18.5 | 15.1 | A | A | 10.2 |

(*4) thickness of the coated layer (xβ') after drying

As shown in Tables 3 and 4, the pressure sensitive adhesive sheets produced in Examples 1 to 18 were confirmed to have the one or more concave portions satisfying the requirements (I) to (III) formed through self-formation of the resin layer on the surface (α), and were good in all the air escape property, the blister resistance, and the adhesive strength.

In all the pressure sensitive adhesive sheets produced in Examples 1 to 18, in the observation of the interior of the region (P) on the surface (α) with the scanning electron microscope (magnification: 30), it was confirmed that the plural concave portions have an irregular shape, did not have a prescribed pattern, and were not formed by transferring an emboss pattern. The fact that the shapes of the one or more concave portions was an irregular shape was also confirmed visually.

In the observation, the shape of the attached surface present in the region (P) on the surface (α) was also an irregular shape.

In all the pressure sensitive adhesive sheets produced in Examples 1 to 18, furthermore, it was confirmed that one or more of the concave portions present in the region (Q) on the surface (α) of the resin layer extended to any of the edges of the square having an edge length of 1 mm, which were the boundary lines of the region (Q), and had a shape continuously extending into other regions (Q') surrounded by a square having an edge length of 1 mm adjacent to the region (Q). This can also be confirmed, for example, from the perspective images of the surface (α) of the resin layer shown in FIGS. 4(b) and 5(b).

Figure 4:
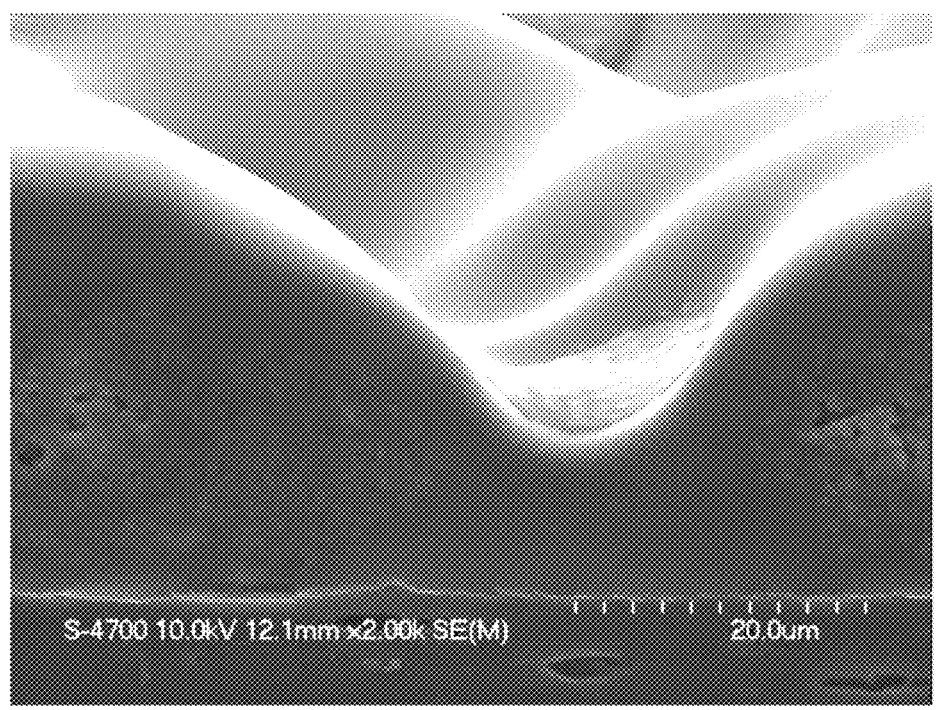
FIG. 4 is images obtained by observing the pressure sensitive adhesive sheet produced in Example 1 with a scanning electron microscope, in which (a) of FIG. 4 is a cross sectional image of the pressure sensitive adhesive sheet, and (b) of FIG. 4 is a perspective image of the pressure sensitive adhesive sheet observed from the side of the surface (α) of the resin layer.
Figure 4:
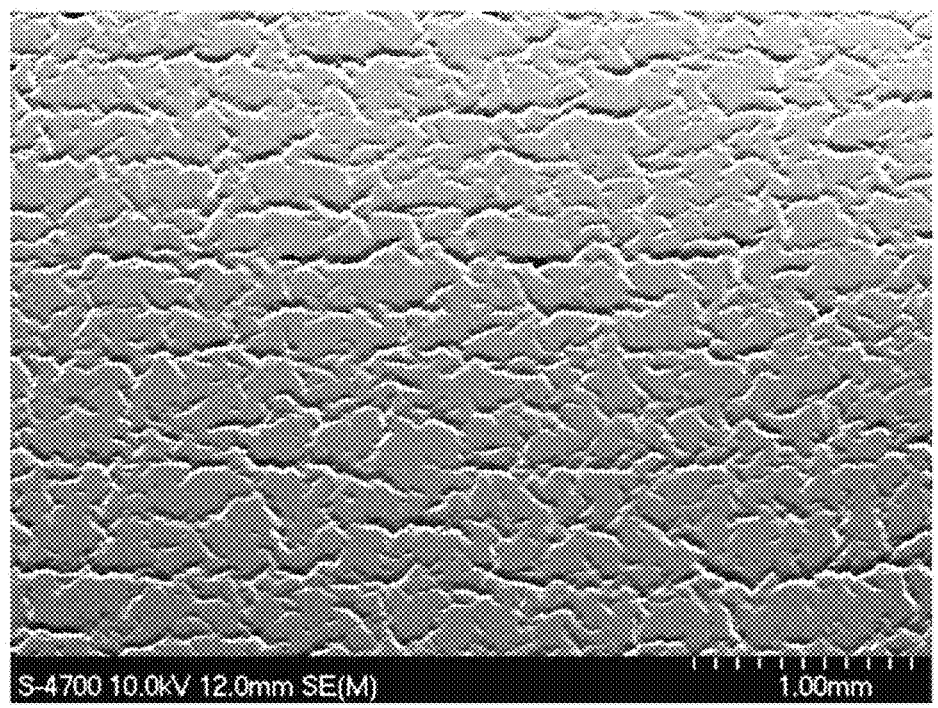
Figure 5:
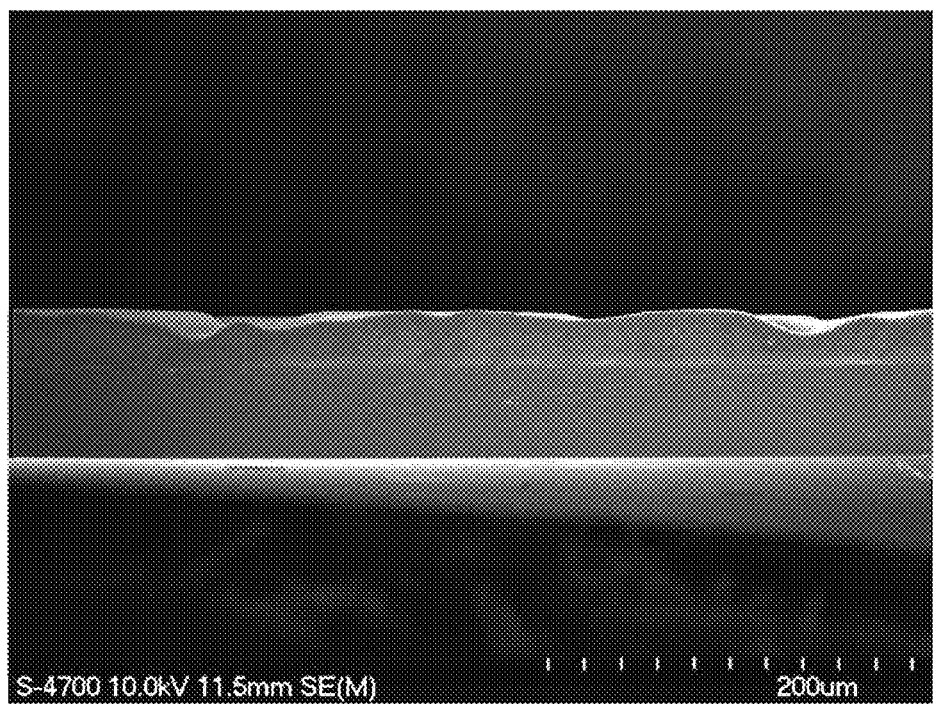
FIG. 5 is images obtained by observing the pressure sensitive adhesive sheet produced in Example 10 with a scanning electron microscope, in which (a) of FIG. 5 is a cross sectional image of the pressure sensitive adhesive sheet, and (b) of FIG. 5 is a perspective image of the pressure sensitive adhesive sheet observed from the side of the surface (α) of the resin layer.
Figure 5:
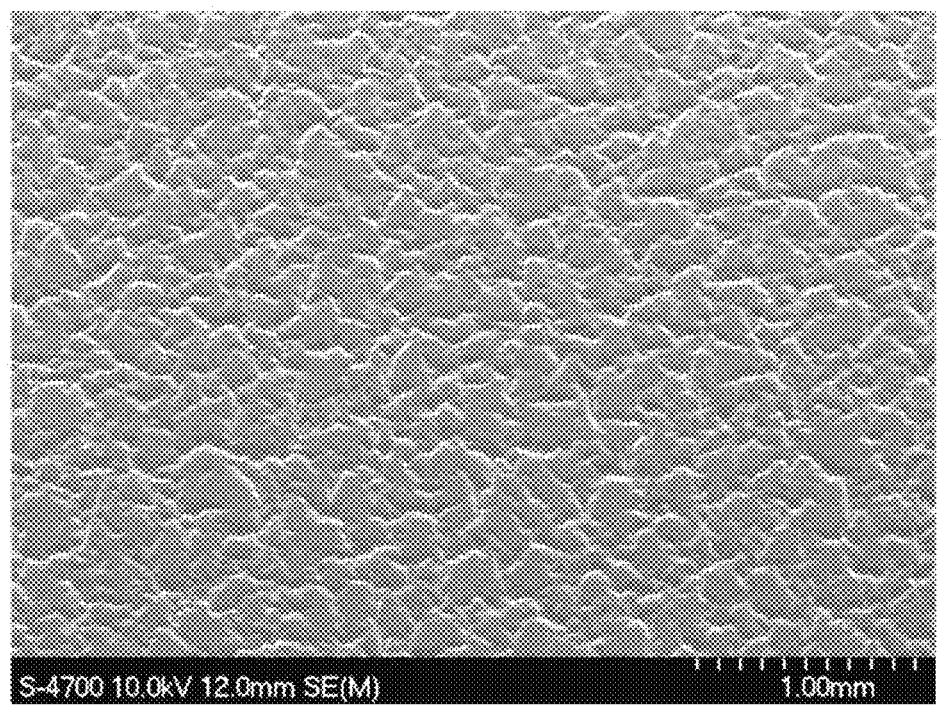

FIGS. 4 and 5 are images obtained by observing the pressure sensitive adhesive sheets produced in Example 1 and 10 with a scanning electron microscope, in which (a) is a cross sectional image of the pressure sensitive adhesive sheet, and (b) is a perspective image of the surface (α) of the resin layer of the pressure sensitive adhesive sheet. In the image in FIG. 4(a), the 10 tick marks shown in the right lower part of the image show a length of 20.0 µm, and in the image in FIG. 4(b), the 10 tick marks shown in the right lower part of the image show a length of 1.00 mm. In the image in FIG. 5(a), the 10 tick marks shown in the right lower part of the image show a length of 200 µm, and in the image in FIG. 5(b), the 10 tick marks shown in the right lower part of the image show a length of 1.00 mm.

While the images in FIGS. 4 and 5 show the shapes of the one or more concave portions present on the surface (α) of the resin layer of the pressure sensitive adhesive sheets produced in Examples 1 and 10, the cross sectional shapes of the one or more concave portions and the shapes of the concave portions observed from the side of the surface (α) of the resin layer of the pressure sensitive adhesive sheets of the other examples were similar to the images shown in FIGS. 4 and 5.

On the other hand, on the surface of the resin layer of the pressure sensitive adhesive sheets produced in Comparative Examples 1 and 2, the formation of the particular one or more concave portions was not confirmed, resulting in poor air escape property. Furthermore, the pressure sensitive adhesive sheet of Comparative Example 1 further resulted in poor blister resistance.

Figure 6:
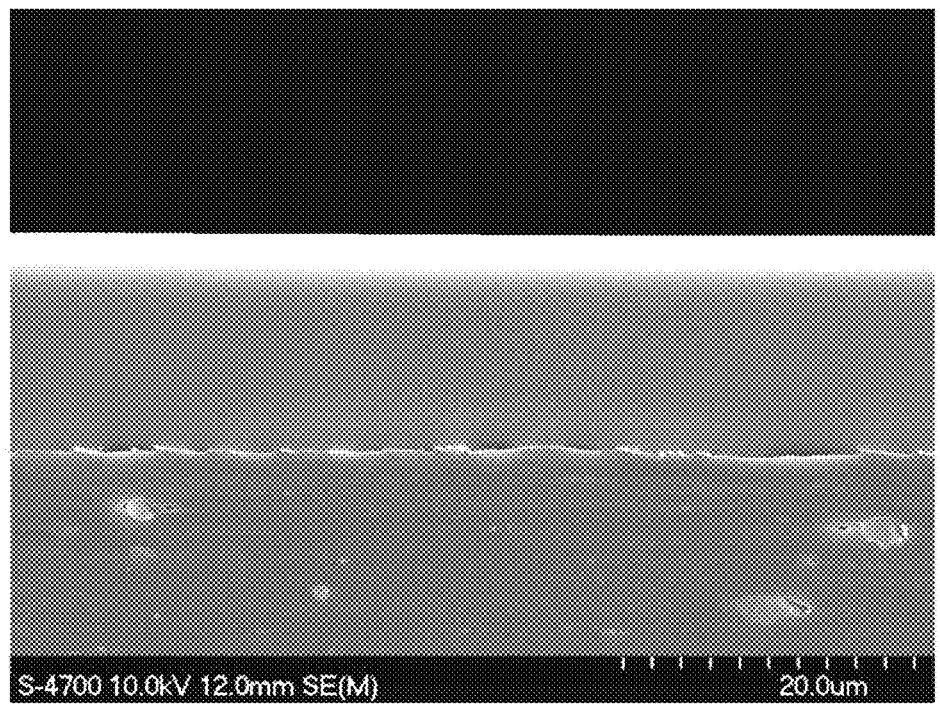
FIG. 6 is images obtained by observing the pressure sensitive adhesive sheet produced in Comparative Example 1 with a scanning electron microscope, in which (a) of FIG. 6 is a cross sectional image of the pressure sensitive adhesive sheet, and (b) of FIG. 6 is a perspective image of the pressure sensitive adhesive sheet observed from the side of the surface (α) of the resin layer.
Figure 6:
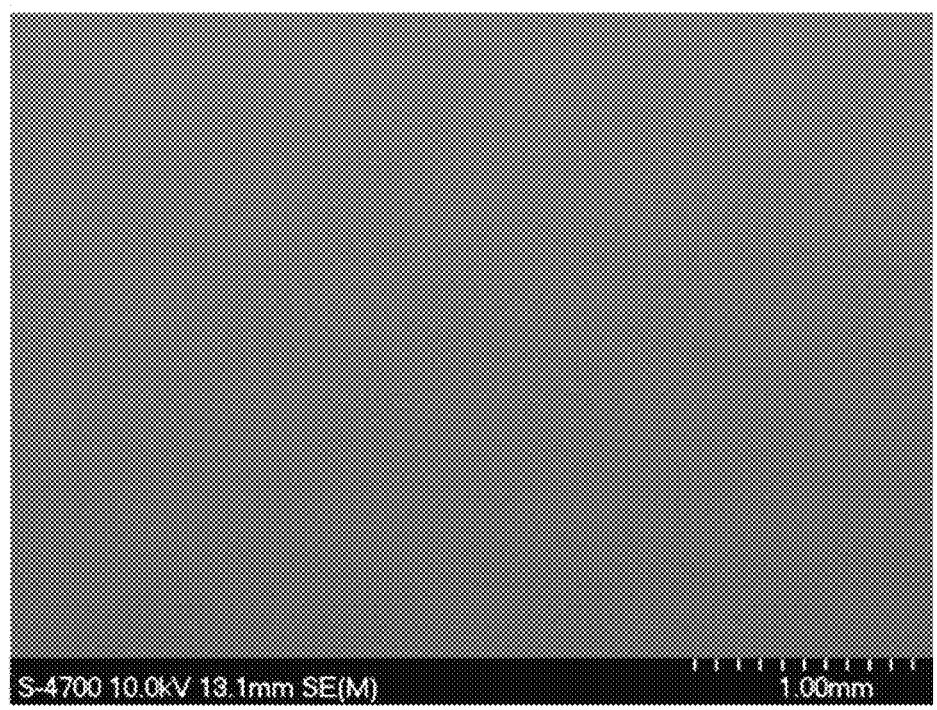

FIG. 6 is images obtained by observing the pressure sensitive adhesive sheet produced in Comparative Example 1 with a scanning electron microscope, in which (a) is a cross sectional image of the pressure sensitive adhesive sheet, and (b) is a perspective image of the surface (α) of the resin layer of the pressure sensitive adhesive sheet.

In the image in FIG. 6(a), the 10 tick marks shown in the image show a length of 20.0 µm, and in the image in FIG. 6(b), the 10 tick marks shown in the image show a length of 1.00 mm.

As shown in the images in FIG. 6, on the surface (α) of the resin layer of the pressure sensitive adhesive sheet produced in Comparative Example 1, the presence of the one or more concave portions was not confirmed.

INDUSTRIAL APPLICABILITY

The pressure sensitive adhesive sheet according to one embodiment of the present invention is useful as a pressure sensitive adhesive sheet having a large attaching area used for identification or decoration, masking for painting, surface protection of a metal plate or the like, and the like.

REFERENCE SIGN LIST 1a, 1b, 2a, 2b pressure sensitive adhesive sheet
11 substrate
12 resin layer
12a surface (α)
12b surface (β)
(X) resin part (X)
(Y) particle part (Y)
(Xβ) layer (Xβ) mainly containing resin part (X)
(Xα) layer (Xα) mainly containing resin part (X)
(Y1) layer (Y1) containing 15% by mass or more of particle part (Y)
13, 130, 131, 132 concave portion
13a intersecting point
14, 14a release material
50, 501, 502, 503, 504 square with edge length of 1 mm

The invention claimed is:

1. A pressure sensitive adhesive sheet, comprising:
   a substrate or a release material; and
   a resin layer on the substrate or the release material,
   wherein the resin layer comprises a resin part (X) comprising a resin as a main component and a particle part (Y) consisting of fine particles having a mean particle size of 0.01 to 100 µm,
   the fine particles comprise silica particles having a mass concentration of silica of 85 to 100% by mass,
   at least a surface (α) of the resin layer on an opposite side with respect to a side on which the substrate or the release material is provided has pressure sensitive adhesiveness,
   the surface (α) has at least one concave portion having irregular shapes.

2. The pressure sensitive adhesive sheet according to claim 1, wherein the at least one concave portion is formed through self-formation of the resin layer.

3. The pressure sensitive adhesive sheet according to claim 1, wherein the at least one concave portion does not have a prescribed pattern.

4. The pressure sensitive adhesive sheet according to claim 1, wherein the at least one concave portion is not formed by transferring an emboss pattern.

5. The pressure sensitive adhesive sheet according to claim 1, wherein the surface (α) has a plurality of the concave portions.

6. The pressure sensitive adhesive sheet according to claim 5, wherein the concave portions have no periodicity.

7. The pressure sensitive adhesive sheet according to claim 1, wherein an attached surface on the surface (α) of the resin layer has an irregular shape.

8. The pressure sensitive adhesive sheet according to claim 7, wherein the irregular shape is visible from an exposed side of the surface (α).

9. The pressure sensitive adhesive sheet according to claim 1, wherein the resin layer comprises a multilayer structure having a layer (Xβ) mainly comprising the resin part (X), a layer (Y1) comprising 15% by mass or more of the particle part (Y), and a layer (Xα) mainly comprising the resin part (X), laminated in an order of the layer (Xβ), the layer (Y1), and the layer (Xα) from the side of the substrate or the release material.

10. The pressure sensitive adhesive sheet according to claim 9, wherein the layer (Xβ) is a layer formed with a composition (xβ) comprising a resin as a main component, wherein:
   the layer (Y1) is a layer formed with a composition (y) comprising 15% by mass or more of fine particles; and
   the layer (Xα) is a layer formed with a composition (xα) comprising a resin as a main component.

11. A method for producing the pressure sensitive adhesive sheet according to claim 10, the method comprising:
   (1A) forming a coating film (xβ') formed by a composition (xβ) comprising a resin as a main component, a coating film (y') formed by a composition (y) comprising 15% by mass or more of the fine particles, and a coating film (xα') formed by a composition (xα) comprising a resin as a main component, by laminating in an order of the coating film (xβ'), the coating film (y'), and the coating film (xα'), on the substrate or the release material; and (2A) drying the coating film (xβ'), the coating film (y'), and the coating film (xα') simultaneously.

12. A method for producing the pressure sensitive adhesive sheet according to claim 10, the method comprising:

(1B) forming a coating film (y') formed by a composition (y) comprising 15% by mass or more of the fine particles and a coating film (xα') formed by a composition (xα) comprising a resin as a main component, by laminating in an order of the coating film (y') and the coating film (xα') on a layer (Xβ) mainly comprising the resin part (X) provided on the substrate or the release material; and (2B) drying the coating film (y') and the coating film (xα') simultaneously.

13. A method for producing the pressure sensitive adhesive sheet according to claim 1, the method comprising:

(1) forming a coating film (x') formed by a composition (x) comprising a resin as a main component, and a coating film (y') formed by a composition (y) comprising 15% by mass or more of fine particles; and (2) drying the coating film (x') and the coating film (y') simultaneously.

14. The pressure sensitive adhesive sheet according to claim 1, wherein the fine particles are the silica particles.

* * * * *